United States Patent
Chen et al.

(10) Patent No.: US 10,663,777 B2
(45) Date of Patent: May 26, 2020

(54) VIEWING ANGLE SWITCHABLE DISPLAY MODULE

(71) Applicant: Coretronic Corporation, Hsin-Chu (TW)

(72) Inventors: Ping-Yen Chen, Hsin-Chu (TW); Wen-Chun Wang, Hsin-Chu (TW); Chung-Yang Fang, Hsin-Chu (TW); Yang-Ching Lin, Hsin-Chu (TW); Jen-Wei Yu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/408,433

(22) Filed: May 9, 2019

(65) Prior Publication Data

US 2019/0265522 A1    Aug. 29, 2019

Related U.S. Application Data

(63) Continuation-in-part of application No. 16/228,777, filed on Dec. 21, 2018.

(30) Foreign Application Priority Data

Dec. 26, 2017    (CN) .................. 2017 2 1843624 U

(51) Int. Cl.
*G02F 1/13*    (2006.01)
*G02F 1/13363*    (2006.01)
*G02F 1/1335*    (2006.01)

(52) U.S. Cl.
CPC ........ *G02F 1/1323* (2013.01); *G02F 1/13363* (2013.01); *G02F 1/133536* (2013.01);
(Continued)

(58) Field of Classification Search
CPC ............. G02F 1/1323; G02F 1/133536; G02F 1/13363
See application file for complete search history.

(56) References Cited

U.S. PATENT DOCUMENTS

2003/0193636 A1\* 10/2003 Allen ................... G02B 5/3083
349/117
2008/0049184 A1\* 2/2008 Tan ........................ G02B 5/305
349/191

(Continued)

*Primary Examiner* — Lucy P Chien
(74) *Attorney, Agent, or Firm* — JCIPRNET

(57) ABSTRACT

A viewing angle switchable display module includes an organic light-emitting display (OLED) panel, a viewing angle switchable device disposed on the OLED panel, and a quarter wave plate disposed between the OLED panel and the viewing angle switchable device. The viewing angle switchable device includes an absorptive polarizer, a reflective polarizer, and an electrically controlled viewing angle switching element. A transmission axis of the reflective polarizer is parallel to a transmission axis of the absorptive polarizer. The electrically controlled viewing angle switching element is disposed between the absorptive polarizer and the reflective polarizer and includes two conductive layers and a liquid crystal layer including liquid crystal molecules. When there is a potential difference between the two conductive layers, an orthogonal projection of an optical axis of each of the liquid crystal molecules on the absorptive polarizer is parallel to or perpendicular to the transmission axis of the absorptive polarizer.

19 Claims, 23 Drawing Sheets

(52) U.S. Cl.
 CPC ...... *G02F 2201/44* (2013.01); *G02F 2413/01* (2013.01); *G02F 2413/05* (2013.01)

(56) References Cited

U.S. PATENT DOCUMENTS

| | | | |
|---|---|---|---|
| 2008/0151147 A1* | 6/2008 | Weber | G02B 5/305 349/96 |
| 2010/0157195 A1* | 6/2010 | Miyatake | G02B 5/3033 349/62 |
| 2010/0277786 A1* | 11/2010 | Anderson | B60R 1/088 359/247 |
| 2011/0043730 A1* | 2/2011 | Do | G02F 1/13363 349/96 |
| 2014/0098330 A1* | 4/2014 | Nam | G02B 5/201 349/96 |
| 2017/0329073 A1* | 11/2017 | Liu | G02B 6/0076 |

* cited by examiner

VIEWING ANGLE SWITCHABLE DISPLAY MODULE

CROSS-REFERENCE TO RELATED APPLICATION

This application is a continuation-in-part application of and claims the priority benefit of U.S. application Ser. No. 16/228,777, filed on Dec. 21, 2018, now pending, which claims the priority benefit of China application serial no. 201721843624.5, filed on Dec. 26, 2017. The entirety of the above-mentioned patent application is hereby incorporated by reference herein and made a part of this specification.

BACKGROUND OF THE INVENTION

Field of the Invention

The invention relates to a display module, and particularly relates to a viewing angle switchable display module.

Description of Related Art

Generally, a display device is usually designed to have a wide viewing angle for displaying so as to be viewed by multiple viewers. However, in some situations or on some occasions, for example, when browsing a private website, viewing some confidential information, or entering a password, a user may be subjected to leak some private or confidential information due to the wide viewing angle of a display which may be viewed by others somewhere else. Generally, a light control film (LCF) may be placed in front of a display to filter out wide-angled beams, so as to avoid a peep. The light control film may be also removed manually for displaying with a wide viewing angle. Since it is inconvenient for a user to place or remove a LCF, a viewing angle switchable device where the viewing angle of a display may be adjusted is in need. With the viewing angle switchable device, a user may adjust or select a wide-angle mode or a narrow-angle mode for the display as required by operation.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a viewing angle switchable display module, which may be switched between a general display mode and a peep-avoiding mode by way of applying a voltage.

Other objects and advantages of the invention can be further illustrated by the technical features broadly embodied and described as follows.

In order to achieve one or a portion of or all of the objects or other objects, an embodiment of the invention provides a viewing angle switchable display module, including an organic light-emitting display panel, a viewing angle switchable device, and a quarter wave plate. The viewing angle switchable device is disposed on a display surface of the organic light-emitting display panel and includes an absorptive polarizer, a reflective polarizer, and an electrically controlled viewing angle switching element. The reflective polarizer is disposed at a side of the absorptive polarizer, wherein a transmission axis of the reflective polarizer is parallel to a transmission axis of the absorptive polarizer. The electrically controlled viewing angle switching element is disposed between the absorptive polarizer and the reflective polarizer and includes two conductive layers and a liquid crystal layer disposed between the two conductive layers, wherein the liquid crystal layer includes a plurality of liquid crystal molecules. When there is a potential difference between the two conductive layers, an orthogonal projection of an optical axis of each of the plurality of liquid crystal molecules on the absorptive polarizer is parallel to or perpendicular to the transmission axis of the absorptive polarizer and the transmission axis of the reflective polarizer. The quarter wave plate is disposed between the organic light-emitting display panel and the viewing angle switchable device.

According to the above description, the embodiments of the invention have at least one of the following advantages or effects. In the embodiments of the invention, an inclination direction of the liquid crystal molecules in the viewing angle switchable device is controlled by changing a potential difference between the two transparent conductive layers. A phase delay is caused in an environmental light beam which enters the viewing angle switchable device by a large angle, causing the environmental light beam to be reflected by the reflective polarizer. A phase delay is caused in a display light beam which enters the viewing angle switchable device by a large angle may not pass through the absorptive polarizer (i.e. may be absorbed by the absorptive polarizer). Since the oblique environmental light beam is reflected by the reflective polarizer and the oblique display light beam is absorbed by the absorptive polarizer, a contrast of light leakage at large angle (light leakage of the display light beam) is decreased, so as to limit the range of the viewing angle (peep-avoiding). By way of electrical control, a viewing angle switchable display module employing the above-mentioned viewing angle switchable device may be switched between a general display mode and a peep-avoiding mode.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. The drawings are not necessarily drawn to scale.

FIG. 6A and FIG. 6B respectively illustrate travelling paths of a display light beam with respect to the X-Z reference plane and the Y-Z reference plane.

FIG. 7A and FIG. 7B respectively illustrate travelling paths of the display light beam with respect to the X-Z reference plane and the Y-Z reference plane.

FIG. 7C illustrates a travelling path of an environmental light beam on the Y-Z reference plane.

FIG. 10A and FIG. 10B respectively illustrate travelling paths of environmental light beams with respect to the X-Z reference plane and the Y-Z reference plane.

FIG. 10C illustrates travelling paths of environmental light beams on the Y-Z reference plane.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
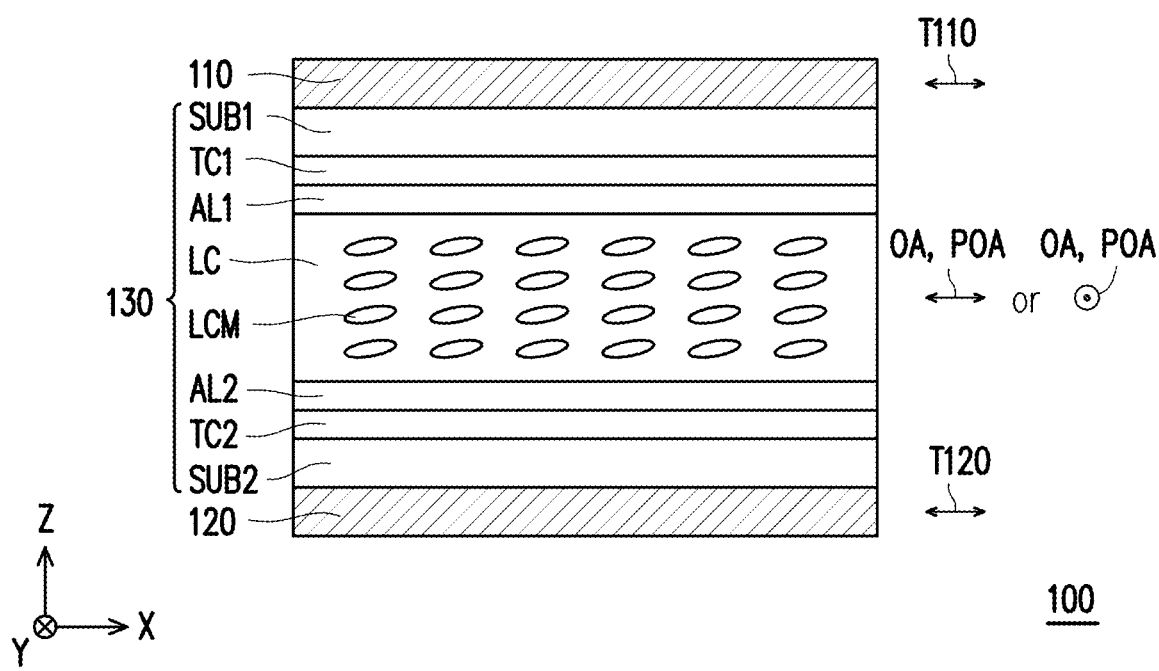
FIG. 1 is a cross-sectional view schematically illustrating a viewing angle switchable device in a general display mode according to a first embodiment of the invention.

FIG. 1 is a cross-sectional view schematically illustrating a viewing angle switchable device in a general display mode according to a first embodiment of the invention. Referring to FIG. 1, a viewing angle switchable device 100 of the first embodiment of the invention includes an absorptive polarizer 110, a reflective polarizer 120 and an electrically controlled viewing angle switching element 130.

The reflective polarizer 120 is disposed at a side of the absorptive polarizer 110, and a transmission axis T120 of the reflective polarizer 120 is parallel to a transmission axis T110 of the absorptive polarizer 110. The electrically controlled viewing angle switching element 130 is disposed between the absorptive polarizer 110 and the reflective polarizer 120, and the electrically controlled viewing angle switching element 130 includes a transparent substrate SUB1, a transparent substrate SUB2, a transparent conductive layer TC1, a transparent conductive layer TC2, and a liquid crystal layer LC.

The transparent substrate SUB1 and the transparent substrate SUB2 are disposed opposite to each other. The transparent conductive layer TC1 and the transparent conductive layer TC2 are disposed between the transparent substrate SUB1 and the transparent substrate SUB2. The liquid crystal layer LC is disposed between the transparent conductive layer TC1 and the transparent conductive layer TC2, and the liquid crystal layer LC includes a plurality of liquid crystal molecules LCM. In the embodiment, the electrically controlled viewing angle switching element 130 may further include an alignment layer AL1 and an alignment layer AL2, where the alignment layer AL1 is disposed between the transparent conductive layer TC1 and the liquid crystal layer LC, and the alignment layer AL2 is disposed between the transparent conductive layer TC2 and the liquid crystal layer LC, so as to orient the liquid crystal molecules LCM.

When there is no potential difference between the transparent conductive layer TC1 and the transparent conductive layer TC2, an optical axis OA of each of the liquid crystal molecules LCM may be substantially parallel to or perpendicular to the absorptive polarizer 110 and the reflective polarizer 120 through the alignment layer AL1 and the alignment layer AL2. In other words, an orthogonal projection POA of the optical axis OA of each of the liquid crystal molecules LCM on the absorptive polarizer 110 is substantially parallel to or perpendicular to the transmission axis T110 of the absorptive polarizer 110 and the transmission axis T120 of the reflective polarizer 120. On the other hand, when there is a potential difference between the transparent conductive layer TC1 and the transparent conductive layer TC2, the liquid crystal molecules LCM are tilted (not shown in FIG. 1) due to the potential difference, and the orthogonal projection POA of the optical axis OA of each of the liquid crystal molecules LCM on the absorptive polarizer 110 is parallel to or perpendicular to the transmission axis T110 of the absorptive polarizer 110 and the transmission axis T120 of the reflective polarizer 120.

Further, as shown in FIG. 1, with the transmission axis T110 of the absorptive polarizer 110 and the transmission axis T120 of the reflective polarizer 120 both extending in a first direction X, the alignment layer AL1 and the alignment layer AL2 may be both oriented in a horizontal alignment in parallel to the first direction X (or a second direction Y), such that when there is no potential difference between the transparent conductive layer TC1 and the transparent conductive layer TC2, the optical axis OA of each of the liquid crystal molecules LCM substantially extends along the first direction X (or the second direction Y). Alternatively, the alignment layer AL1 and the alignment layer AL2 may be both oriented in a vertical alignment, i.e. when there is no potential difference between the transparent conductive layer TC1 and the transparent conductive layer TC2, the optical axis OA of each of the liquid crystal molecules LCM substantially extends along a direction Z of the thickness of the viewing angle switchable device 100 (not shown in FIG. 1). Regardless of the horizontal alignment or the vertical alignment, when there is a potential difference between the transparent conductive layer TC1 and the transparent conductive layer TC2, the liquid crystal molecules LCM are tilted due to the potential difference, such that the optical axis OA of each of the liquid crystal molecules LCM is inclined (not shown in FIG. 1) relative to the transmission axis T110 of the absorptive polarizer 110 and the transmission axis T120 of the reflective polarizer 120, i.e. an angle ranging from 0 to 90 is formed between the optical axis OA of each of the liquid crystal molecules LCM and the transmission axis T110 of the absorptive polarizer 110 (or between the optical axis OA of each of the liquid crystal molecules LCM and the transmission axis T120 of the reflective polarizer 120). Moreover, when there is a potential difference between the transparent conductive layer TC1 and the transparent conductive layer TC2, the orthogonal projection POA of the optical axis OA of each of the liquid crystal molecules LCM on the absorptive polarizer 110 (or on the reflective polarizer 120) is parallel to or perpendicular to the transmission axis T110 of the absorptive polarizer 110 and the transmission axis T120 of the reflective polarizer 120. To be specific, the orthogonal projection POA of the optical axis OA of each of the liquid crystal molecules LCM on the absorptive polarizer 110 (or on the reflective polarizer 120) extends along the first direction X or the second direction Y.

By changing the potential difference between the transparent conductive layer TC1 and the transparent conductive layer TC2, an inclination direction of the liquid crystal molecules LCM is controlled. As such, a phase delay is caused in a light beam which enters the viewing angle switchable device 100 by a large angle along the second direction Y, such that the light beam cannot pass through the absorptive polarizer 110. As a result, the range of the viewing angle is narrowed (peep-avoiding). As for a viewing angle switchable display module employing the viewing angle switchable device 100, it may be switched between a general display mode and a peep-avoiding mode in an electric control manner (as described in further detail from FIG. 6A to FIG. 7D). Besides the peep-avoiding, with the configuration of the reflective polarizer 120, an environmental light beam which enters the viewing angle switchable device 100 by a large angle is reflected by the reflective polarizer 120, so as to enhance the reflection of the environmental light beam by the viewing angle switchable device 100. As such, a contrast of large angle light leakage of the viewing angle switchable device 100 is decreased so as to help avoid a peep from a large angle.

Other implementations of the viewing angle switchable device are described below with reference of FIG. 2 to FIG. 5, where the same components are denoted by the same referential numbers, and details thereof are not repeated. FIG. 2, FIG. 3, FIG. 4A and FIG. 5 are respectively cross-sectional views schematically illustrating viewing angle switchable devices in the general display mode according to a second embodiment to a fifth embodiment of the invention. FIG. 4B is a top view schematically illustrating a reflective polarizer in FIG. 4A.

Figure 2:
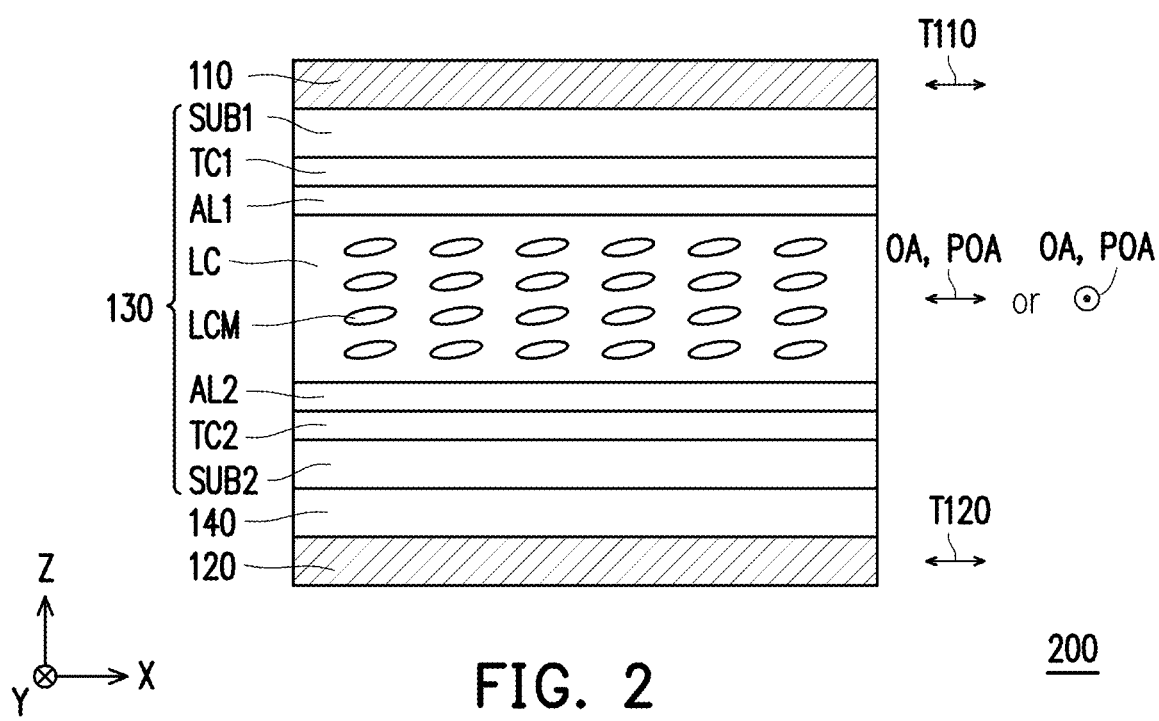
FIG. 2, FIG. 3, FIG. 4A and FIG. 5 are respectively cross-sectional views schematically illustrating viewing angle switchable devices in the general display mode according to a second embodiment to a fifth embodiment of the invention.

Referring to FIG. 2, main differences between the viewing angle switchable device 200 of the second embodiment of the invention and the viewing angle switchable device 100 of FIG. 1 are as follows. The viewing angle switchable device 200 further includes a compensation film 140. The compensation film 140 is disposed between the absorptive polarizer 110 and the reflective polarizer 120 and is overlapped with the electrically controlled viewing angle switching element 130. As shown in FIG. 2, the compensation film 140 may be located between the electrically controlled viewing angle switching element 130 and the reflective polarizer 120, though the invention is not limited thereto. In another embodiment, the compensation film 140 may be located between the electrically controlled viewing angle switching element 130 and the absorptive polarizer 110.

The compensation film 140 may be an A-type plate, an O-type plate, a C-type (e.g. negative C-type) plate, a biaxial plate or a composite plate constructed by at least two of the above four types of plates. Each of the A-type plate, the O-type plate and the C-type (e.g. negative C-type) plate may be made of liquid crystal polymers. As for the A-type plate, optical axes of the liquid crystal polymers are parallel to a film surface of the A-type plate. As for the O-type plate, optical axes of the liquid crystal polymers are inclined relative to a film surface of the O-type plate. As for the C-type (e.g. negative C-type) plate, optical axes of the liquid crystal polymers are perpendicular to a film surface of the C-type e.g. negative C-type) plate. Moreover, an out-of-plane retardation (also referred to as "Rth") of the compensation film 140 may be within a range from 200 nm to 700 nm. And an in-plane retardation (also referred to as "Ro") of the compensation film 140 may be less than 200 nm. The out-of-plane retardation of the compensation film 140 equals to $[(Nx+Ny)/2-Nz]*D$, wherein Nx, Ny, and Nz are refractive indices of three principal axes of the compensation film 140, and D is the thickness of the compensation film 140. The in-plane retardation of the biaxial compensation film 140 equals to $(Nx-Ny)*D$. Every two of Nx, Ny, and Nz are perpendicular to each other, wherein Nz is parallel to the thickness direction of the compensation film 140, and Nx and Ny, are parallel to the compensation film 140.

By configuring the compensation film 140, the large angle light leakage of the viewing angle switchable device 200 in the second direction Y is mitigated. Besides, the large angle light leakage in an azimuth 0±45 degrees and an azimuth 180±45 degrees is decreased, and reflection of the environmental light beam in the azimuth 0±45 degrees and the azimuth 180±45 degrees is increased, so as to decrease the contrast of the oblique viewing angle. As such, peep from a large angle is avoided. As for a viewing angle switchable display module employing the viewing angle switchable device 200, in the general display mode, the viewing angle of a display image is not limited by the electrically controlled viewing angle switching element 130 and the compensation film 140 disposed between the absorptive polarizer 110 and the reflective polarizer 120. On the other hand, in the peep-avoiding mode, a phase delay is caused in the light beam entering the viewing angle switchable device 200 by a large angle and passing through the electrically controlled viewing angle switching element 130 via the electric control manner, and the large angle light leakage of the azimuth 0±45 degrees and the azimuth 180±45 degrees is decreased by using the compensation film 140. As such, a peep from a large angle is effectively avoided. Moreover, in the embodiment, the reflection of the environmental light beam is enhanced by using the reflective polarizer 120, thus the contrast of the large angle light leakage is decreased and a peep from a large angle is effectively avoided.

Figure 3:
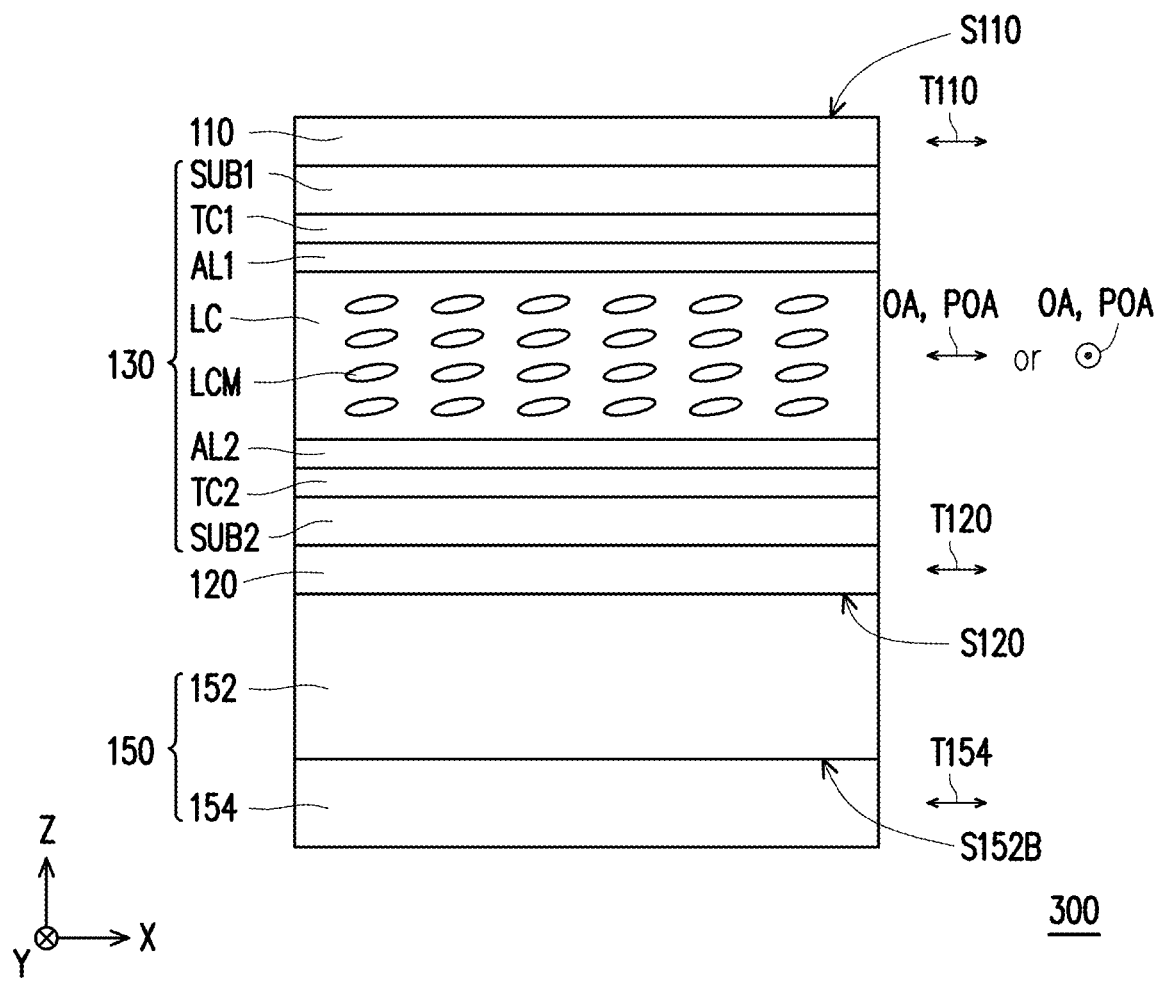

Referring to FIG. 3, main differences between the viewing angle switchable device 300 of the third embodiment of the invention and the viewing angle switchable device 100 of FIG. 1 are as follows. The viewing angle switchable device 300 further includes a compensation element 150. The compensation element 150 includes a compensation film 152 and an absorptive polarizer 154. The compensation film 152 of the compensation element 150 may be an A-type plate, an O-type plate, a C-type (e.g. negative C-type) plate, a biaxial plate or a composite plate constructed by at least two of the above four types of plates. Moreover, a transmission axis T154 of the absorptive polarizer 154 of the compensation element 150 is parallel to the transmission axis T110 of the absorptive polarizer 110 and the transmission axis T120 of the reflective polarizer 120.

The compensation element 150 may be disposed adjacent to the absorptive polarizer 110 or adjacent to the reflective polarizer 120, and the compensation film 152 of the compensation element 150 is disposed between the absorptive polarizer 154 of the compensation element 150 and an adjacent polarizer (the absorptive polarizer 110 or the reflective polarizer 120). In the embodiment, the compensation element 150 is disposed on a surface 5120 of the reflective polarizer 120 away from the electrically controlled viewing angle switching element 130, and the compensation film 152 of the compensation element 150 is disposed between the absorptive polarizer 154 of the compensation element 150 and the reflective polarizer 120. For example, the absorptive polarizer 154 of the compensation element 150 is disposed on a surface of the compensation film 152 of the compensation element 150 away from the electrically controlled viewing angle switching element 130 (for example, a lower surface S152B of the compensation film 152), though the invention is not limited thereto. In another embodiment, the compensation element 150 may be disposed on a surface 5110 of the absorptive polarizer 110 away from the electrically controlled viewing angle switching element 130, and the compensation film 152 of the compensation element 150 is disposed between the absorptive polarizer 154 of the compensation element 150 and the absorptive polarizer 110. For example, the absorptive polarizer 154 of the compensation element 150 is disposed on a surface of the compensation film 152 of the compensation element 150 away from the electrically controlled viewing angle switching element 130.

By configuring the compensation element 150, the large angle light leakage of the viewing angle switchable device 300 in the second direction Y is mitigated. Besides, the large angle light leakage of the azimuth 0±45 degrees and the azimuth 180±45 degrees is also decreased, such that a better peep-avoiding effect is achieved. As for a viewing angle switchable display module employing the viewing angle switchable device 300, in the peep-avoiding mode, a phase delay is caused in the light beam entering the viewing angle switchable device 300 by a large angle and passing through the electrically controlled viewing angle switching element 130 via the electric control manner, and the large angle light leakage of the azimuth 0±45 degrees and the azimuth 180±45 degrees is decreased by using the compensation component 150. As such, a peep from a large angle is effectively avoided.

In an embodiment, the viewing angle switchable device 300 may further include the compensation film 140 of FIG. 2.

Figure 4A:
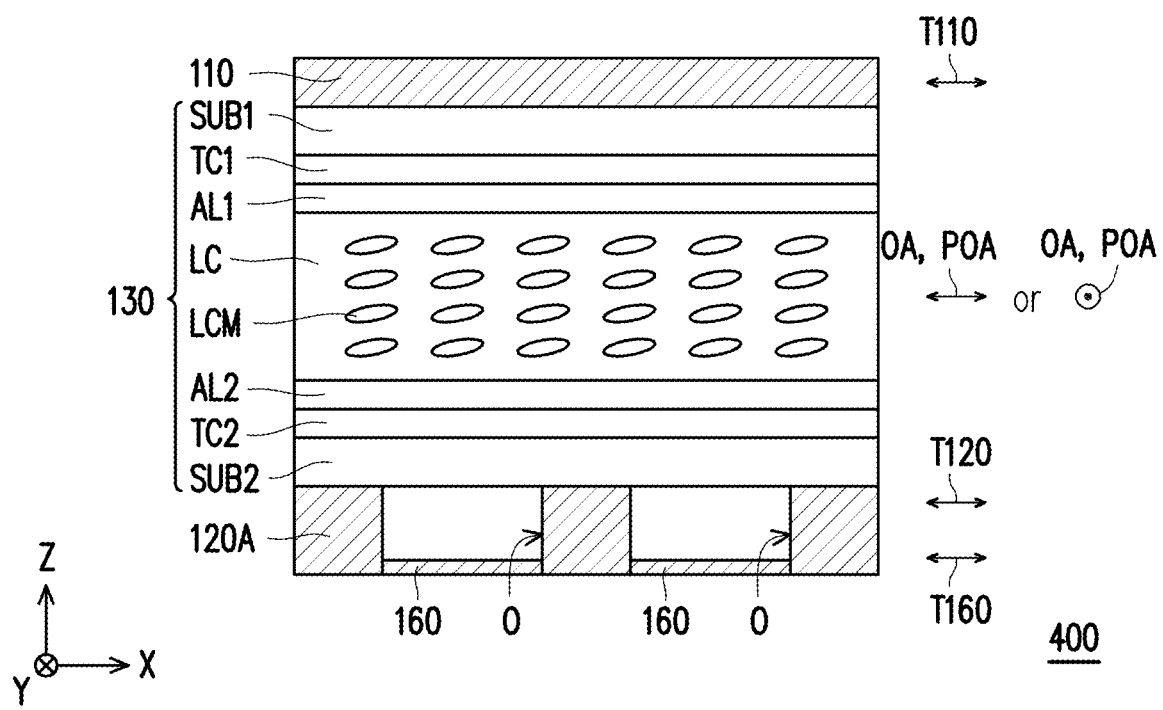
Figure 4B:
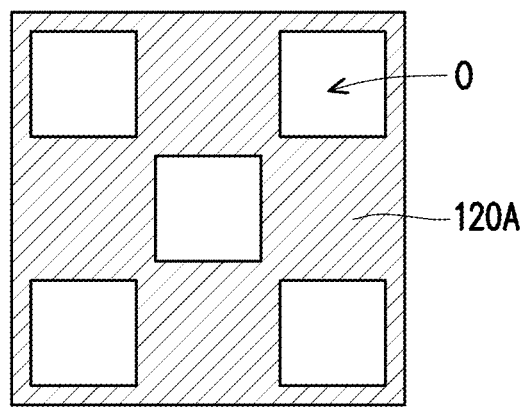
FIG. 4B is a top view schematically illustrating a reflective polarizer in FIG. 4A.

Referring to FIG. 4A and FIG. 4B, main differences between the viewing angle switchable device 400 of the fourth embodiment of the invention and the viewing angle switchable device 100 of FIG. 1 are as follows. In the viewing angle switchable device 400, the reflective polarizer 120A has at least one opening O. In FIG. 4B, the reflective polarizer 120A has 5 openings O, and each of the openings O is a quadrilateral opening. However, the number and the shape of the openings O and the distribution of the openings O in the reflective polarizer 120A may be changed as required, which are not limited to the embodiments shown in FIG. 4A and FIG. 4B. Moreover, each of the openings O may be configured with another absorptive polarizer (for example, an absorptive polarizer 160), and a transmission axis T160 of the absorptive polarizer 160 is parallel to the transmission axis T110 of the absorptive polarizer 110 and the transmission axis T120 of the reflective polarizer 120.

The reflective polarizer 120A has a predetermined pattern through the openings O of the reflective polarizer 120A. Since the predetermined pattern is reflected when an environmental light beam enters the viewing angle switchable device 300 by a large angle, the large angle light leakage is interfered. As such, the openings O of the reflective polarizer 120A are favourable in peep-avoiding.

In an embodiment, the viewing angle switchable device 400 may further include the compensation film 140 of FIG. 2, the compensation element 150 of FIG. 3, or a combination of the compensation film 140 of FIG. 2 and the compensation element 150 of FIG. 3.

Figure 5:
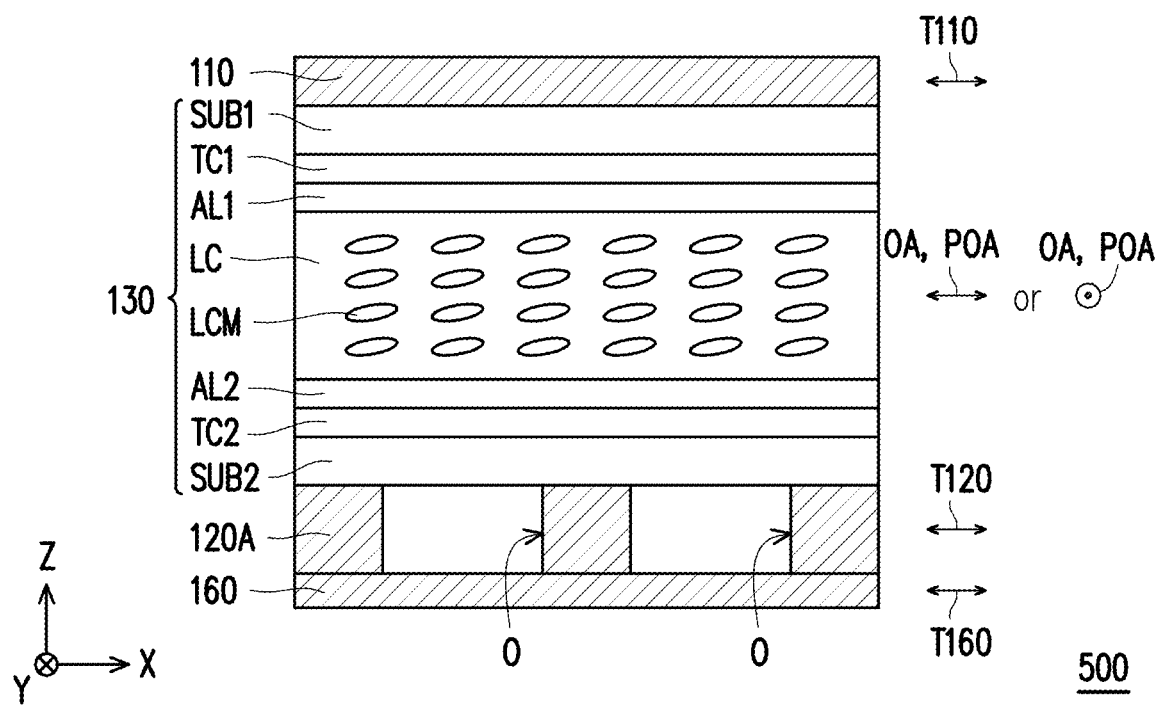

Referring to FIG. 5, main differences between the viewing angle switchable device 500 of the fifth embodiment of the invention and the viewing angle switchable device 400 of FIG. 4A are as follows. In the viewing angle switchable device 400, each opening O is configured with one absorptive polarizer 160. Namely, the number of the absorptive polarizers 160 and the number of the openings O are identical. In the viewing angle switchable device 500, the reflective polarizer 120A is disposed between the absorptive polarizer 160 and the electrically controlled viewing angle switching element 130, and the number of the absorptive polarizer 160 is one. Moreover, the absorptive polarizer 160 covers all of the openings O.

In an embodiment, the viewing angle switchable device 500 may further include the compensation film 140 of FIG. 2, the compensation element 150 of FIG. 3, or a combination of the compensation film 140 of FIG. 2 and the compensation element 150 of FIG. 3.

Figure 6A:
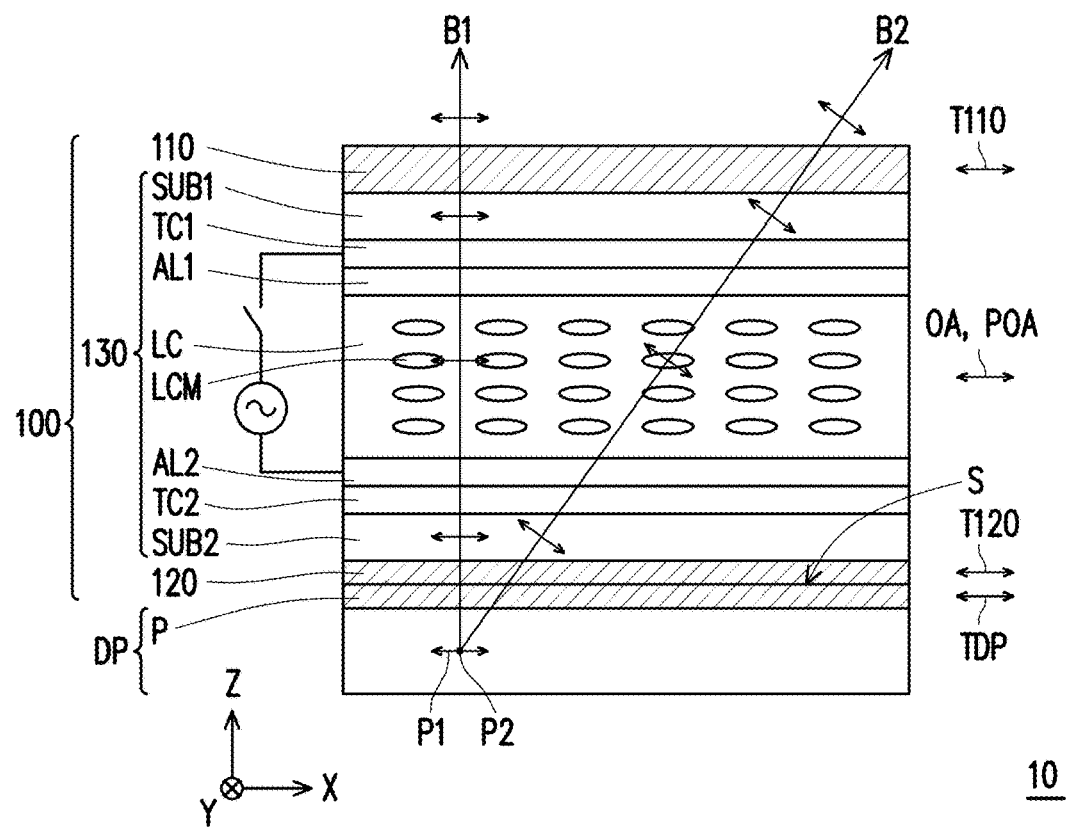
FIG. 6A and FIG. 6B are cross-sectional views respectively in an X-Z reference plane and a Y-Z reference plane schematically illustrating a viewing angle switchable display module in the general display mode according to a first embodiment of the invention.
Figure 6B:
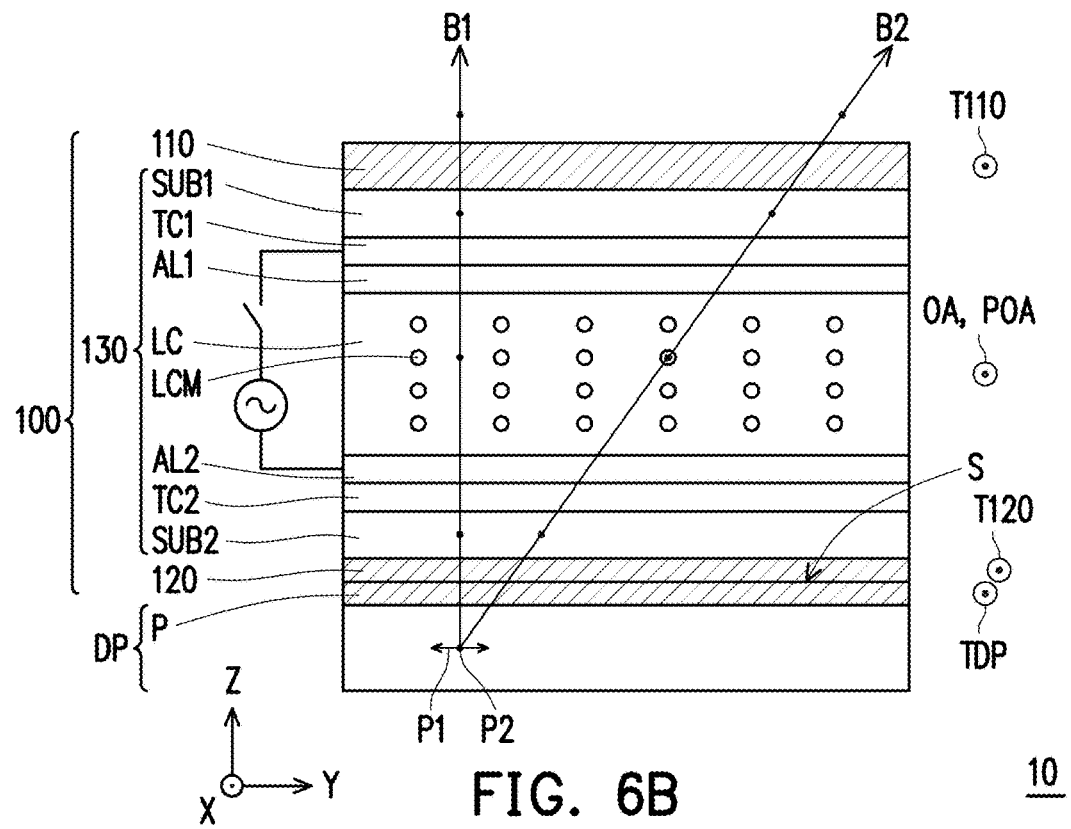
Figure 6C:
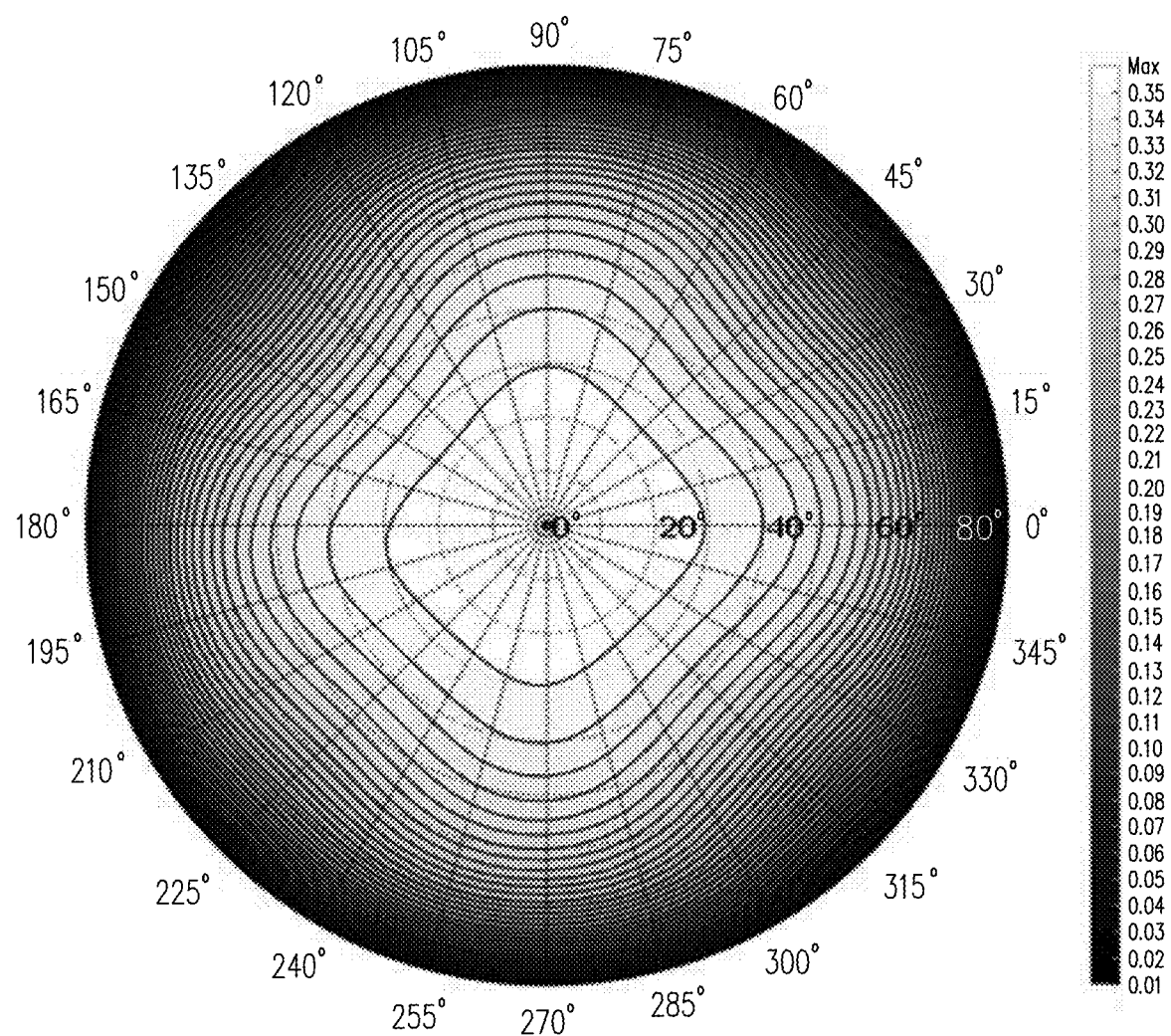
FIG. 6C is a schematic diagram of angle distribution, which represents transmittances at different viewing angles of the viewing angle switchable display module in the general display mode of the first embodiment.
Figure 6C:
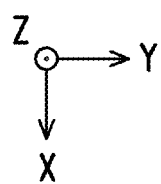
Figure 7A:
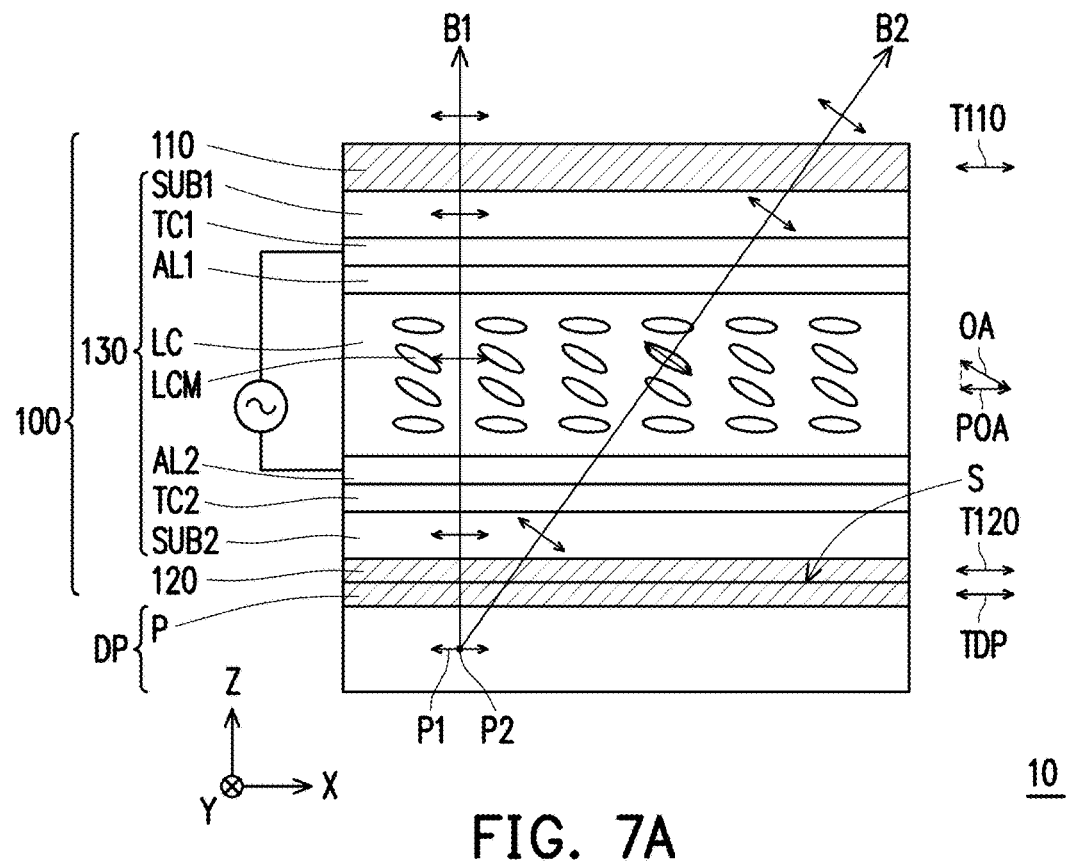
FIG. 7A and FIG. 7B are cross-sectional views respectively in the X-Z reference plane and the Y-Z reference plane schematically illustrating a viewing angle switchable display module in an peep-avoiding mode in according to the first embodiment of the invention.
Figure 7B:
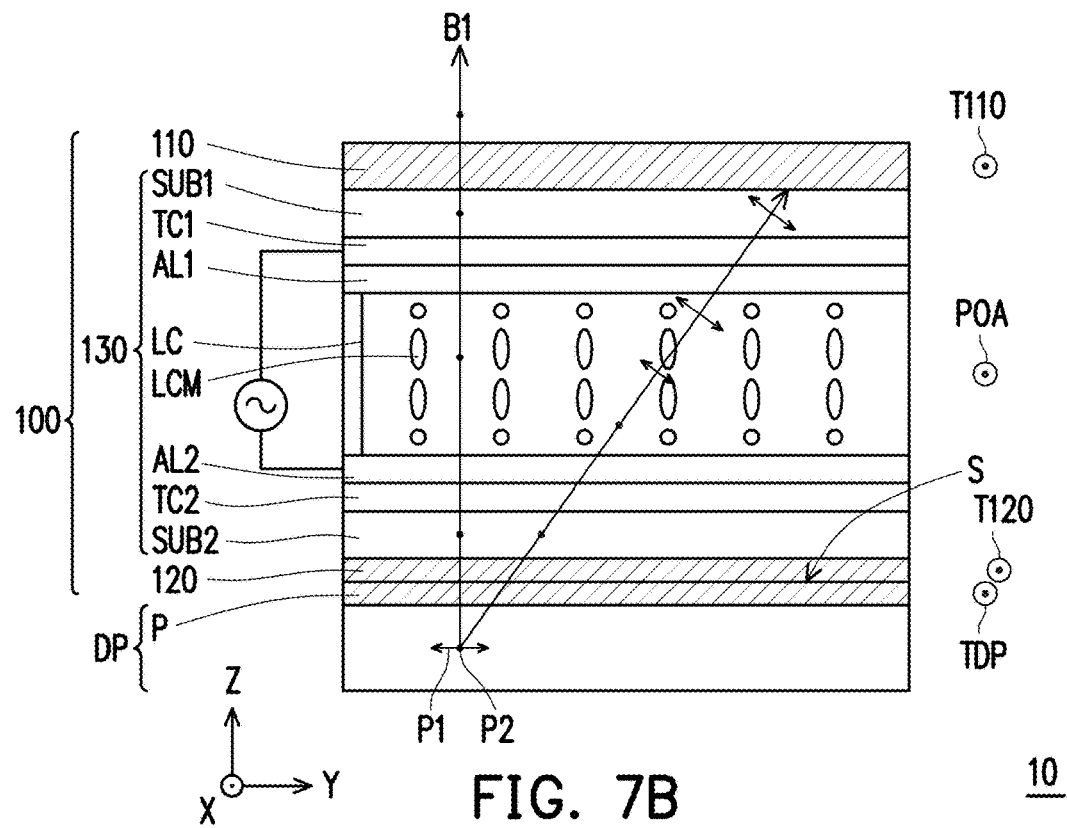
Figure 7C:
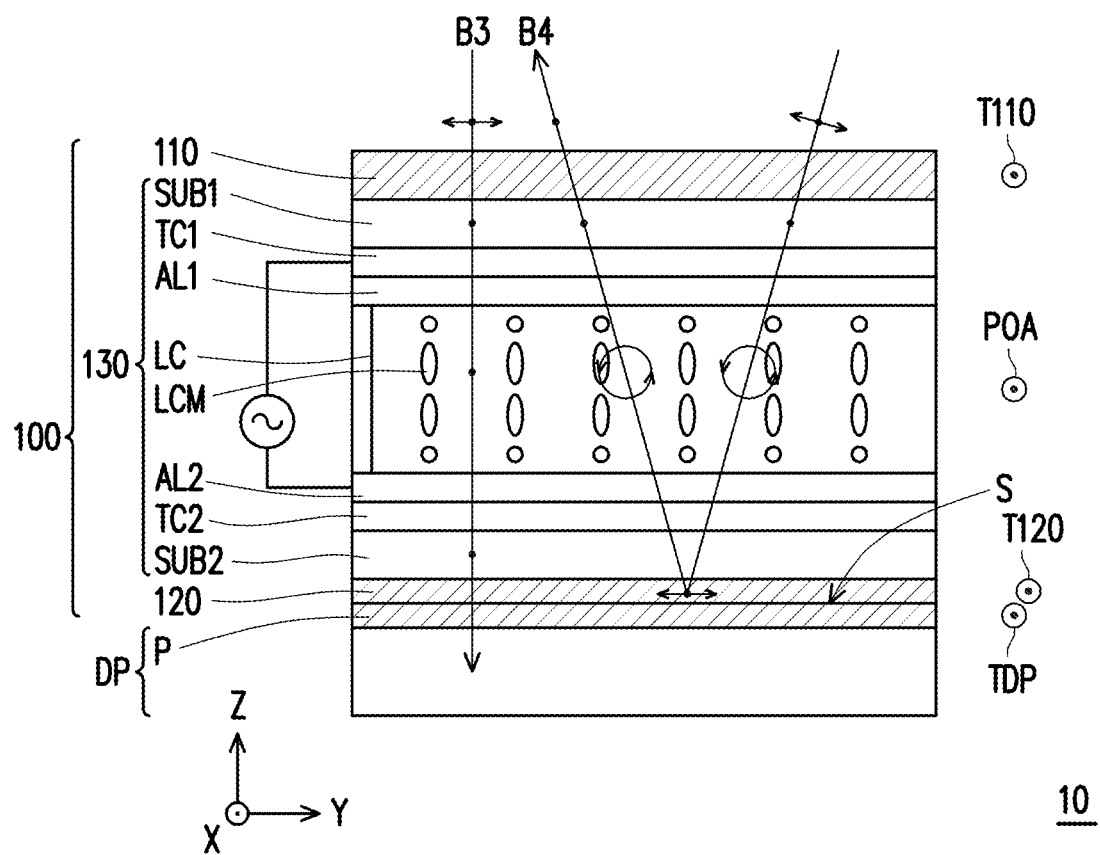
FIG. 7C is a cross-sectional view of a viewing angle switchable display module in the peep-avoiding mode in the Y-Z reference plane according to the first embodiment of the invention.
Figure 7D:
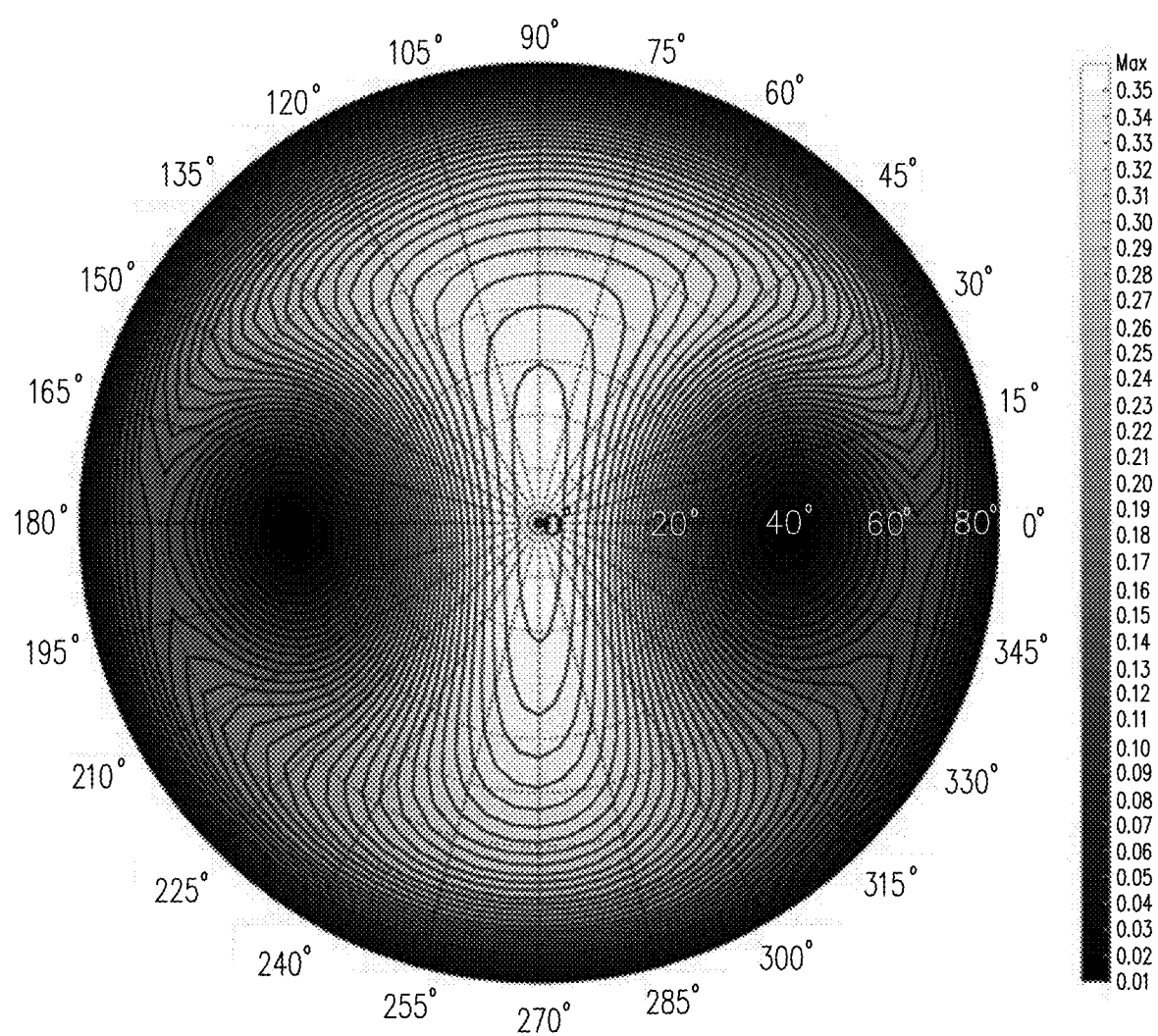
FIG. 7D is a schematic diagram of angle distribution, which represents transmittances at different viewing angles of the viewing angle switchable display module in the peep-avoiding mode of the first embodiment.
Figure 7D:
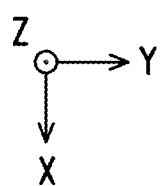

The general display mode and the peep-avoiding mode of a viewing angle switchable display module employing the viewing angle switchable devices of the invention are described below with reference of FIG. 6A to FIG. 7D. FIG. 6A and FIG. 6B are cross-sectional views respectively in an X-Z reference plane and a Y-Z reference plane schematically illustrating a viewing angle switchable display module in the general display mode according to a first embodiment of the invention. FIG. 6A and FIG. 6B respectively illustrate travelling paths of a display light beam with respect to the X-Z reference plane and the Y-Z reference plane. FIG. 6C is a schematic diagram of angle distribution, which represents transmittances at different viewing angles of the viewing angle switchable display module in the general display mode of the first embodiment. FIG. 7A and FIG. 7B are cross-sectional views respectively in the X-Z reference plane and the Y-Z reference plane schematically illustrating a viewing angle switchable display module in an peep-avoiding mode in according to the first embodiment of the invention. FIG. 7A and FIG. 7B respectively illustrate travelling paths of the display light beam with respect to the X-Z reference plane and the Y-Z reference plane. FIG. 7C is a cross-sectional view of a viewing angle switchable display module in the peep-avoiding mode in the Y-Z reference plane according to the first embodiment of the invention, and FIG. 7C illustrates a travelling path of an environmental light beam on the Y-Z reference plane. FIG. 7D is a schematic diagram of angle distribution, which represents transmittances at different viewing angles of the viewing angle switchable display module in the peep-avoiding mode of the first embodiment.

Referring to FIG. 6A and FIG. 6B, a viewing angle switchable display module 10 of the first embodiment of the invention includes a display panel DP and a viewing angle switchable device (for example, the viewing angle switchable device 100 of FIG. 1).

The display panel DP may be any type of display panel, for example, a self-luminous display panel or a non-self-luminous display panel. The self-luminous display panel is, for example, an organic light-emitting display panel. On the other hand, the non-self-luminous display panel is, for example, a liquid crystal display panel, though the invention is not limited thereto. When the display panel DP is the non-self-luminous display panel, the display module 10 may include a polarizer or further include a backlight module (not shown). The backlight module may be a direct type backlight module or a side incident type backlight module. When the display panel DP is the self-luminous display panel, the display module 10 may or may not include a polarizer and do not further include a backlight module (not shown).

The display module DP may have one polarizer (for example, an absorptive polarizer). Further, the display panel DP may have a polarizer P located at a light emitting side of the display panel DP, so as to output light beams with a specific polarization direction. Moreover, a transmission axis TDP of the polarizer P is parallel to the transmission axis T120 of the reflective polarizer 120, such that the light beam passing through the polarizer P may further pass through the reflective polarizer 120. In the embodiment, the transmission axis TDP of the polarizer P is parallel to the first direction X and an opposite direction of the first direction X, so that the polarizer P allows the display light beam with a polarization direction (for example, a first polarization direction P1) parallel to the first direction X and the opposite direction of the first direction X to pass through, and blocks the display light beam with a polarization direction (for example, a second polarization direction P2) parallel to the second direction Y and an opposite direction of the second direction Y. In another embodiment, the display panel DP may further has another polarizer (not shown), and the another polarizer is located at a light incident side of the display panel DP, where a transmission axis of the polarizer located at the light incident side of the display panel DP may be parallel to or perpendicular to the transmission axis TDP of the polarizer P.

The viewing angle switchable device 100 is disposed on a display surface S (for example, a light emitting surface of the polarizer P) of the display panel DP and is switched between the general display mode and the peep-avoiding mode in an electric control manner, which is described in detail below.

Referring to FIG. 6A to FIG. 6C, when there is no potential difference between the transparent conductive layer TC1 and the transparent conductive layer TC2, a polarization direction of the display light beam entering the viewing angle switchable device 100 from the reflective polarizer 120 is parallel to an orthogonal projection of the optical axis OA of each of the liquid crystal molecules LCM on a polarization plane (a plane perpendicular to a travelling path of the display light beam). As such, transmittances of the display light beams at various incident angles (including a display light beam B1 vertically entering the viewing angle switchable device 100 and a display light beam B2 entering the viewing angle switchable device 100 by a large angle) is not influenced. Moreover, since a reflectivity of the display panel DP is very low, when the environmental light beam is incident to the viewing angle switchable device 100, both the environmental light beam vertically entering the viewing angle switchable device 100 and the environmental light beam entering the viewing angle switchable device 100 by a large angle are absorbed by the display panel DP. As a result, in a general display mode, the display image is prevented from being interfered by the environmental light beam.

Referring to FIG. 7A to FIG. 7D, when there is a potential difference between the transparent conductive layer TC1 and the transparent conductive layer TC2, the optical axis OA of each of the liquid crystal molecules LCM is tilted due to an electric field. In FIG. 7A to FIG. 7D, the orthogonal projection POA of the optical axis OA of each of the liquid crystal molecules LCM on the absorptive polarizer 110 extends in the first direction X, i.e. when there is a potential difference between the transparent conductive layer TC1 and the transparent conductive layer TC2, the orthogonal projection POA of the optical axis OA of each of the liquid crystal molecules LCM on the absorptive polarizer 110 is parallel to the transmission axis T110 of the absorptive polarizer 110 and the transmission axis T120 of the reflective polarizer 120, though the invention is not limited thereto. In another embodiment, the orthogonal projection POA of the optical axis OA of each of the liquid crystal molecules LCM on the absorptive polarizer 110 may extend in a second direction Y, i.e. when there is a potential difference between the transparent conductive layer TC1 and the transparent conductive layer TC2, the orthogonal projection POA of the optical axis OA of each of the liquid crystal molecules LCM on the absorptive polarizer 110 may be perpendicular to the transmission axis T110 of the absorptive polarizer 110 and the transmission axis T120 of the reflective polarizer 120.

Referring to FIG. 7A, as for the display light beam on the X-Z reference plane, a polarization direction of the display light beam is also parallel to the orthogonal projection of the optical axis OA of each of the liquid crystal molecules LCM on the polarization plane, so that transmittances of the display light beams at various incident angles (including the display light beam B1 vertically entering the viewing angle switchable device 100 and the display light beam B2 entering the viewing angle switchable device 100 by a large angle) is not influenced. Referring to FIG. 7B, as for the display light beam on the Y-Z reference plane, a polarization direction of the display light beam B1 vertically entering the viewing angle switchable device 100 is also parallel to the orthogonal projection of the optical axis OA of each of the liquid crystal molecules LCM on the polarization plane, so that the transmittances of the display light beam B1 vertically entering the viewing angle switchable device 100 is not influenced. However, the polarization direction of the display light beam B2 incident to the viewing angle switchable device 100 by a large angle and the orthogonal projection of the optical axis OA of each of the liquid crystal molecules LCM on the polarization plane form an angle therebetween, such that the polarization direction of the display light beam B2 is changed. The larger the angle is, the less of display light beam B2 passing through the absorptive polarizer 110 (i.e. the transmittance is lower). As a result, a peep is avoiding by narrowing the range of the viewing angle from the second direction Y and the opposite direction of the second direction Y.

Referring to FIG. 7C, it should be noted that, as for the environmental light beam on the Y-Z reference plane, a polarization direction of the environmental light beam B3 vertically entering the viewing angle switchable device 100 is parallel to the orthogonal projection of the optical axis OA of each of the liquid crystal molecules LCM on the polarization plane, so that in the peep-avoiding mode, the environmental light beam B3 vertically entering the viewing angle switchable device 100 is absorbed by the display panel DP without the display image from a front view. On the other hand, a polarization direction of an environmental light beam B4 incident to the viewing angle switchable device 100 by a large angle and the orthogonal projection of the optical axis OA of each of the liquid crystal molecules LCM on the polarization plane form an angle therebetween, such that the polarization direction of the environmental light beam B4 is changed. Subsequently, a part of the environmental light beam B4 is reflected by the reflective polarizer 120. The environmental light beam B4 reflected by the reflective polarizer 120 may again pass through the liquid crystal layer LC to change the polarization direction of the environmental light beam B4. Then, the environmental light beam B4 may pass through the absorptive polarizer 110. Since the environmental light beam B4 is reflected by the reflective polarizer 120 and then passes through the absorptive polarizer 110, reflection of the environmental light beam by the viewing angle switchable device 100 is enhanced. By enhancing the reflection of the environmental light beam, the contrast of the large angle light leakage is decreased, and thus a peep is further avoided.

In another embodiment, the viewing angle switchable device 100 of the viewing angle switchable display module 10 may be replaced by the viewing angle switchable device 200 of FIG. 2, the viewing angle switchable device 300 of FIG. 3, the viewing angle switchable device 400 of FIG. 4A, or the viewing angle switchable device 500 of FIG. 5. In still another embodiment, the viewing angle switchable display module 10 may adopt the viewing angle switchable device 100 of FIG. 1 (or the viewing angle switchable device 200 of FIG. 2, the viewing angle switchable device 400 of FIG. 4A, or the viewing angle switchable device 500 of FIG. 5), and the viewing angle switchable display module 10 may further include the compensation element 150 of FIG. 3, where the compensation element 150, the display panel DP and the viewing angle switchable device 100 are overlapped with each other. For example, the compensation element 150 and the viewing angle switchable device 100 may be sequentially disposed on the display panel DP, or positions of the compensation element 150 and the viewing angle switchable device 100 may be exchanged.

Figure 8:
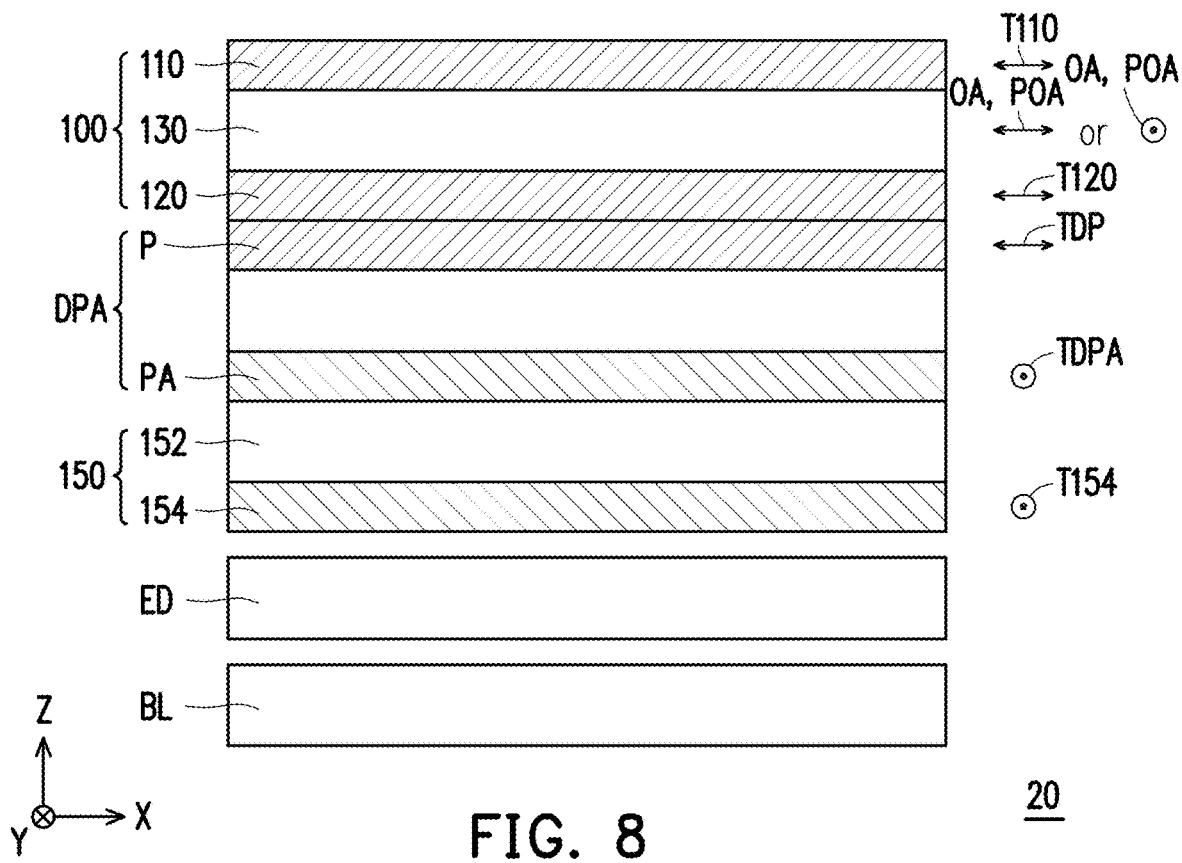
FIG. 8 and FIG. 9 are cross-sectional views schematically illustrating viewing angle switchable display modules according to a second embodiment and a third embodiment of the invention.
Figure 9:
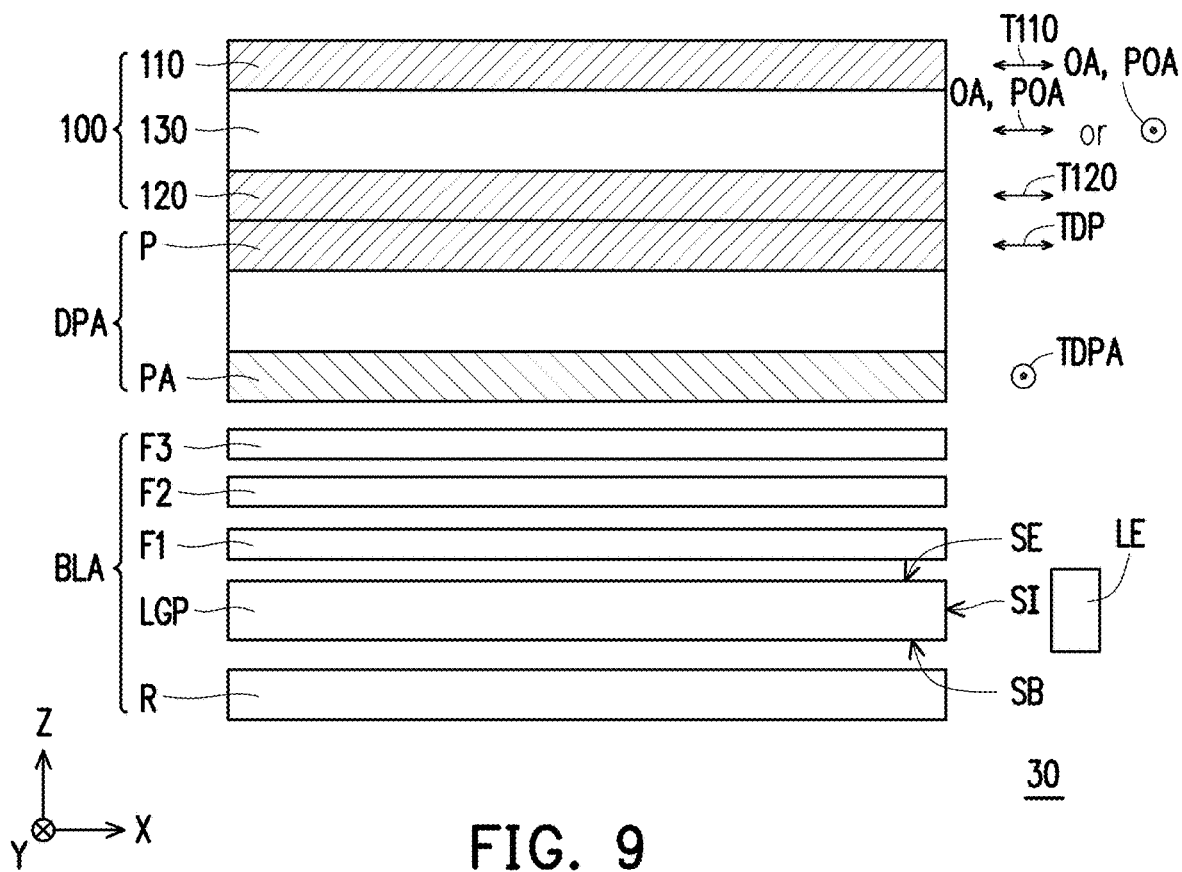

Other implementations of the viewing angle switchable display module 10 are described below with reference of FIG. 8 and FIG. 9, where the same components are denoted by the same referential numbers, and details thereof are not repeated. FIG. 8 and FIG. 9 are cross-sectional views schematically illustrating viewing angle switchable display modules according to a second embodiment and a third embodiment of the invention.

Referring to FIG. 8, main differences between the viewing angle switchable display module 20 of the second embodiment of the invention and the viewing angle switchable display module 10 of FIG. 6A are as follows. In the viewing angle switchable display module 10 of FIG. 6A, the display panel DP may be a self-luminous display panel, such as an organic light-emitting display panel. In the viewing angle switchable display module 20, the display panel DP is a non-self-luminous display panel, such as an In-Plane-Switching (IPS) liquid crystal display panel, though the invention is not limited thereto. Moreover, the viewing angle switchable display module 20 further includes a collimation backlight module BL, an electrically controlled optical diffuser ED, and the compensation element 150 of FIG. 3.

The collimation backlight module BL may be implemented by any conventionally backlight module which may provide a collimated light beam. The electrically controlled optical diffuser ED may include two transparent substrates (not shown), two transparent conductive layers (not shown) disposed between the two transparent substrates and a Polymer-Dispersed Liquid Crystal (PDLC) (not shown) disposed between the two transparent conductive layers. When there is no potential difference between the two transparent conductive layers, the PDLC may be in a transparent state, and when there is a potential difference between the two transparent conductive layers, the PDLC may be in a scattering state. In the general display mode, the PDLC in the scattering state may provide a planar light source with a more uniform light intensity distribution. In the peep-avoiding mode, the PDLC in the transparent state may provide a collimated planar light source.

Besides the polarizer P, the display panel DPA further includes a polarizer PA, and the polarizer PA is located at a light incident side (a side of the display panel DPA facing the collimation backlight module BL) of the display panel DPA. In the embodiment, the display panel DPA is located between the viewing angle switchable device 100 and the compensation element 150. The transmission axis TDP of the polarizer P is perpendicular to a transmission axis TDPA of the polarizer PA. Moreover, the transmission axis TDP of the polarizer P, the transmission axis T120 of the reflective polarizer 120 and the transmission axis T110 of the absorptive polarizer 110 are parallel to each other, and the orthogonal projection POA of the optical axis OA of each of the liquid crystal molecules LCM in the viewing angle switchable device 100 on the absorptive polarizer 110 is parallel to or perpendicular to the transmission axis T110 of the absorptive polarizer 110, while the transmission axis TDPA of the polarizer PA is parallel to the transmission axis T154 of the absorptive polarizer 154 of the compensation element 150. However, the relative configuration relationships of the above components and the extending directions of the transmission axes may be changed as required, which are not limited to the implementation shown in FIG. 8.

For example, in another embodiment, the compensation element 150 may be located between the viewing angle switchable device 100 and the display panel DPA. In still another embodiment, the compensation element 150 may be omitted in the configuration of FIG. 8, and the compensation film 152 is disposed between the polarizer P and the reflective polarizer 120. In yet another embodiment, the compensation element 150 is omitted. In any of the aforementioned embodiments, the viewing angle switchable device 100 may be replaced by the viewing angle switchable device 200 of FIG. 2, the viewing angle switchable device 400 of FIG. 4A or the viewing angle switchable device 500 of FIG. 5.

Referring to FIG. 9, main differences between the viewing angle switchable display module 30 of the third embodiment of the invention and the viewing angle switchable display module 20 of FIG. 8 are as follows. The compensation element 150 and the electrically controlled optical diffuser ED of FIG. 8 are omitted from the viewing angle switchable display module 30. Moreover, the collimation backlight module BL is replaced by a backlight module BLA. The backlight module BLA includes at least one diffuser F1, a prism sheet F2 and a prism sheet F3. In the embodiment, the backlight module BLA may further include at least one light-emitting element LE, a light guide plate LGP and a reflector R. The light guide plate LGP has a light entering surface SI, a bottom surface SB and a light emitting surface SE, where the bottom surface SB and the light emitting surface SE are opposite to each other, and the light entering surface SI is connected to the bottom surface SB and the light emitting surface SE. The light-emitting element LE is disposed beside the light entering surface SI. The reflector R is located below the bottom surface SB. The diffuser F1, the prism sheet F2 and the prism sheet F3 are sequentially stacked on the light emitting surface SE.

In another embodiment, the backlight module BLA may further include another diffuser or a Dual Brightness Enhancement Film (DBEF), and this another diffuser (or the DBEF) may be disposed on the prism sheet F3. Moreover, the viewing angle switchable display module 20 may further include the compensation element 150 of FIG. 8, and the compensation element 150 may be disposed between the backlight module BLA and the display panel DPA or between the viewing angle switchable device 100 and the display panel DPA. In still another embodiment, the compensation film 152 may be configured between the polarizer P and the reflective polarizer 120. In any of the aforementioned embodiments, the viewing angle switchable device 100 may be replaced by the viewing angle switchable device 200 of FIG. 2, the viewing angle switchable device 300 of FIG. 3, the viewing angle switchable device 400 of FIG. 4A or the viewing angle switchable device 500 of FIG. 5.

Figure 10A:
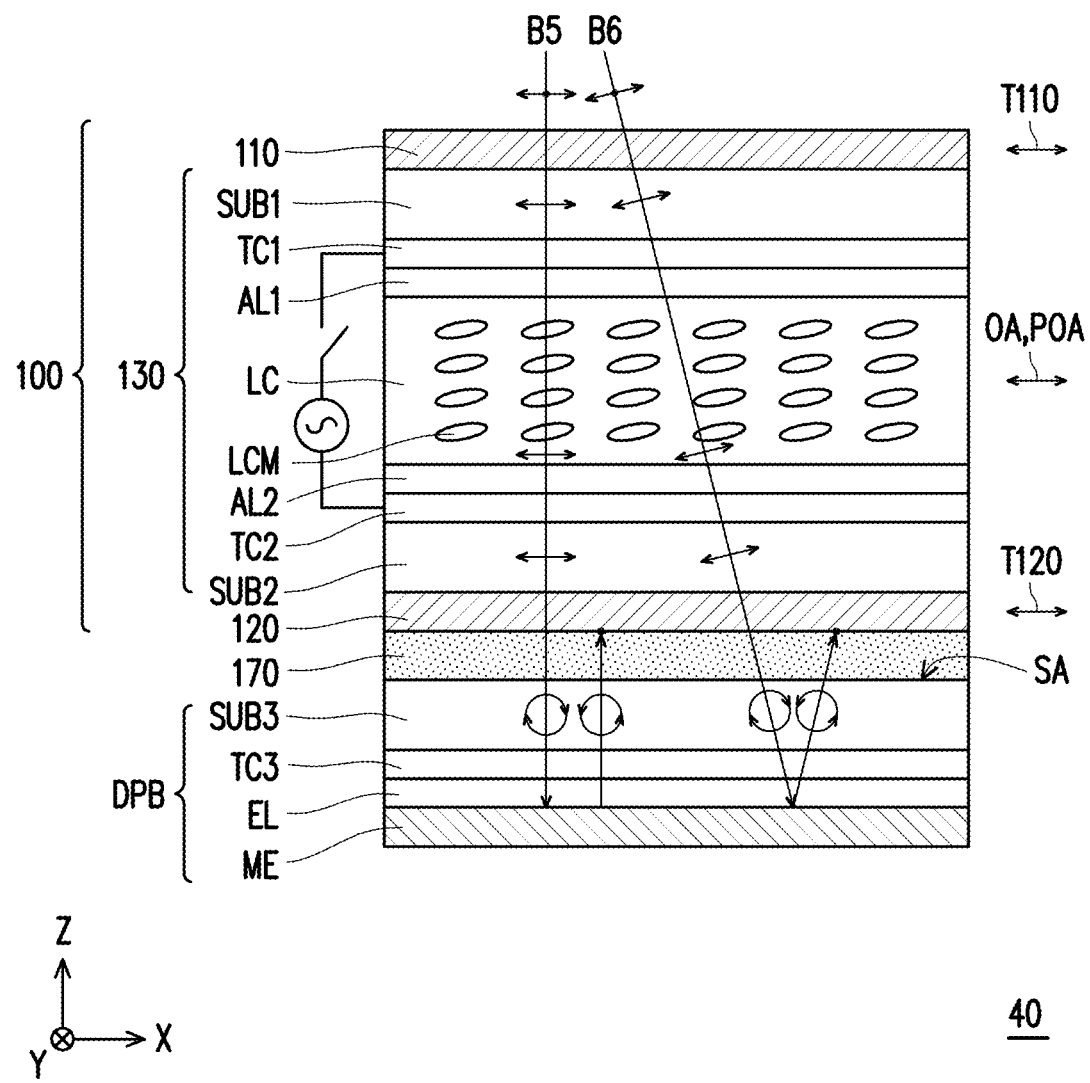
FIG. 10A and FIG. 10B are cross-sectional views respectively in the X-Z reference plane and the Y-Z reference plane schematically illustrating a viewing angle switchable display module in the general display mode according to a fourth embodiment of the invention.
Figure 10B:
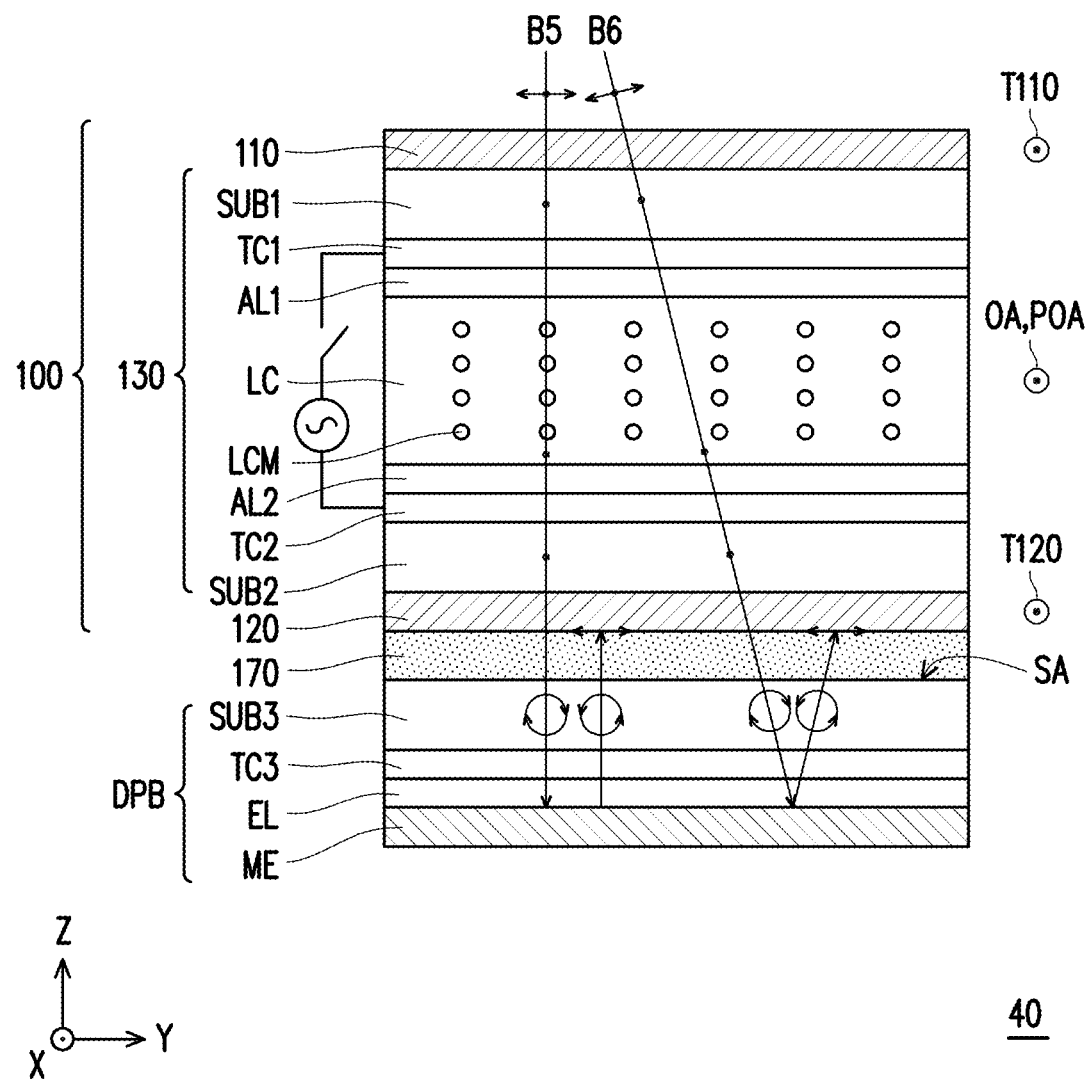
Figure 10C:
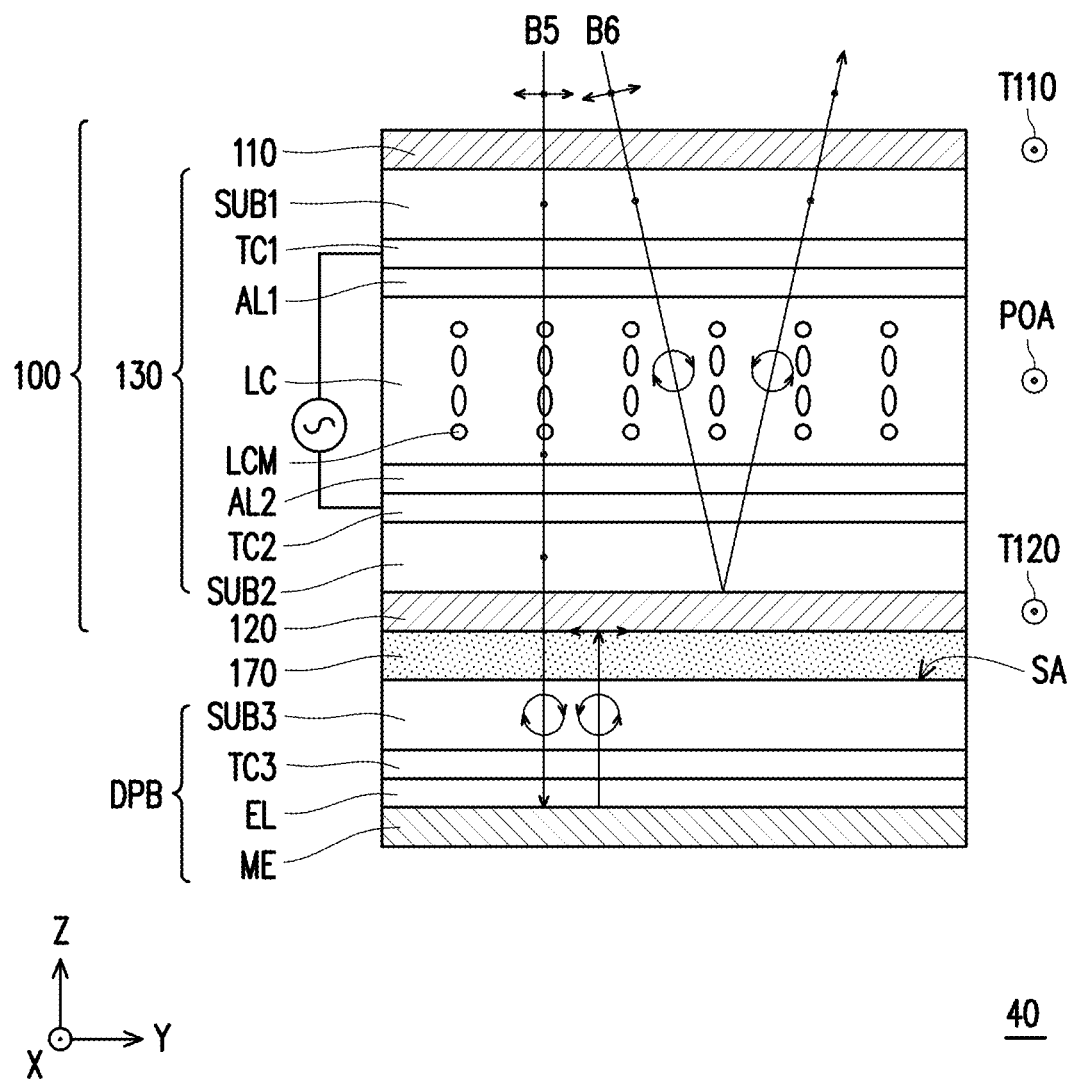
FIG. 10C is a cross-sectional view of the viewing angle switchable display module in the peep-avoiding mode in the Y-Z reference plane according to the fourth embodiment of the invention.

FIG. 10A and FIG. 10B are cross-sectional views respectively in the X-Z reference plane and the Y-Z reference plane schematically illustrating a viewing angle switchable display module in the general display mode according to a fourth embodiment of the invention. FIG. 10A and FIG. 10B respectively illustrate travelling paths of environmental light beams with respect to the X-Z reference plane and the Y-Z reference plane. FIG. 10C is a cross-sectional view of the viewing angle switchable display module in the peep-avoiding mode in the Y-Z reference plane according to the fourth embodiment of the invention, and FIG. 10C illustrates travelling paths of environmental light beams on the Y-Z reference plane.

Referring to FIG. 10A, main differences between the viewing angle switchable display module 40 of the fourth embodiment of the invention and the viewing angle switchable display module 10 of FIG. 6A are as follows. In the viewing angle switchable display module 40, the display panel DP in FIG. 6A is replaced by an organic light-emitting display panel DPB, and the viewing angle switchable device 100 is disposed on a display surface SA of the organic light-emitting display panel DPB. Moreover, the viewing angle switchable display module 40 further includes a quarter wave plate 170 disposed between the organic light-emitting display panel DPB and the viewing angle switchable device 100.

For example, the organic light-emitting display panel DPB includes a substrate SUB3, a conductive layer TC3, a light emitting layer EL, and a metal layer ME, though the invention is not limited thereto. The conductive layer TC3, the light emitting layer EL, and the metal layer ME are sequentially disposed on the substrate SUB3 along the opposite direction of the direction Z. The substrate SUB3 is a transparent substrate to allow light beams (e.g. display light beams) to pass through. The conductive layer TC3 is a transparent conductive layer to allow light beams (e.g. the display light beams) to pass through. The light emitting layer EL is adapted to emit the display light beams when there is a potential difference between the conductive layer TC3 and the metal layer ME. The metal layer ME is adapted to reflect light beams (e.g. the display light beams) transmitted thereto.

Referring to FIG. 10A and FIG. 10B, when there is no potential difference between the transparent conductive layer TC1 and the transparent conductive layer TC2, travelling paths of the display light beams (not shown) emitted by the light emitting layer EL are similar to the travelling paths of the display light beams B1 and B2 shown in FIG. 6A and FIG. 6B, thus details thereof are not repeated. Moreover, when environmental light beams (e.g. environmental light beams B5 and B6) are incident to the viewing angle switchable device 100, both the environmental light beam B5 vertically entering the viewing angle switchable device 100 and the environmental light beam B6 entering the viewing angle switchable device 100 by a large angle are reflected by the metal layer ME and then are blocked by the reflective polarizer 120. As a result, in the general display mode, the display image is prevented from being interfered by the environmental light beams.

Referring to FIG. 10C, when there is a potential difference between the transparent conductive layer TC1 and the transparent conductive layer TC2, each of the liquid crystal molecules LCM is tilted due to an electric field. In FIG. 10C, the orthogonal projection POA of the optical axis of each of the liquid crystal molecules LCM on the absorptive polarizer 110 extends in the first direction X, i.e. when there is a potential difference between the transparent conductive layer TC1 and the transparent conductive layer TC2, the orthogonal projection POA of the optical axis of each of the liquid crystal molecules LCM on the absorptive polarizer 110 is parallel to the transmission axis T110 of the absorptive polarizer 110 and the transmission axis T120 of the reflective polarizer 120, though the invention is not limited thereto. In another embodiment, the orthogonal projection POA of the optical axis of each of the liquid crystal molecules LCM on the absorptive polarizer 110 may extend in a second direction Y, i.e. when there is a potential difference between the transparent conductive layer TC1 and the transparent conductive layer TC2, the orthogonal projection POA of the optical axis of each of the liquid crystal molecules LCM on the absorptive polarizer 110 may be perpendicular to the transmission axis T110 of the absorptive polarizer 110 and the transmission axis T120 of the reflective polarizer 120.

Referring to FIG. 10C, when there is a potential difference between the transparent conductive layer TC1 and the transparent conductive layer TC2, travelling paths of the display light beams (not shown) emitted by the light emitting layer EL are similar to the travelling paths of the display light beams B1 and B2 shown in FIG. 7A and FIG. 7B, thus details thereof are not repeated. It should be noted that, in the peep-avoiding mode, for the environmental light beams B5 and B6 on the Y-Z reference plane, a polarization direction of the environmental light beam B5 vertically entering the viewing angle switchable device 100 is parallel to the orthogonal projection POA of the optical axis of each of the liquid crystal molecules LCM on the polarization plane, so that the environmental light beam B5 vertically entering the viewing angle switchable device 100 is reflected by the metal layer ME and then is blocked by the reflective polarizer 120. On the other hand, a polarization direction of an environmental light beam B6 incident to the viewing angle switchable device 100 by a large angle and the orthogonal projection POA of the optical axis of each of the liquid crystal molecules LCM on the polarization plane form an angle therebetween, such that the polarization direction of the environmental light beam B6 is changed. Subsequently, a part of the environmental light beam B6 is reflected by the reflective polarizer 120. The environmental light beam B6 reflected by the reflective polarizer 120 may again pass through the liquid crystal layer LC to change the polarization direction of the environmental light beam B6. Then, the environmental light beam B6 may pass through the absorptive polarizer 110. Since the environmental light beam B6 is reflected by the reflective polarizer 120 and then passes through the absorptive polarizer 110, reflection of the environmental light beam by the viewing angle switchable device 100 is enhanced. By enhancing the reflection of the environmental light beam, the contrast of the large angle light leakage is decreased, and thus a peep is further avoided.

Figure 10D:
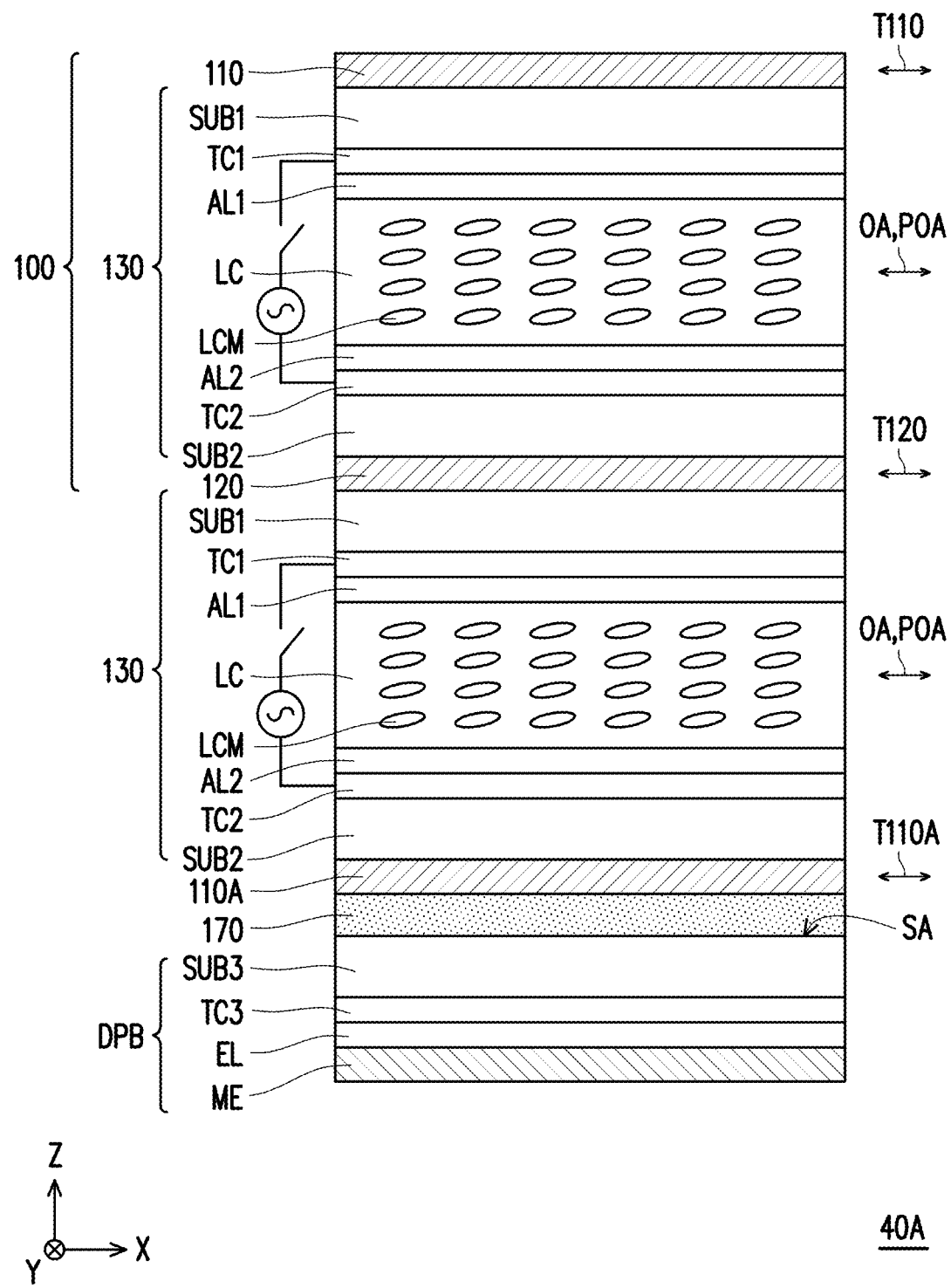
FIG. 10D and FIG. 10E are other cross-sectional views schematically illustrating viewing angle switchable display modules according to the fourth embodiment of the invention.

In another embodiment, referring to the viewing angle switchable display module 40A in FIG. 10D, to further avoid the peep, another electrically controlled viewing angle switching element 130 and an absorptive polarizer 110A may be disposed between the reflective polarizer 120 and the quarter wave plate 170, wherein a transmission axis T110A of the absorptive polarizer 110A is parallel to the transmission axis T110 of the absorptive polarizer 110 and the transmission axis T120 of the reflective polarizer 120.

Figure 10E:
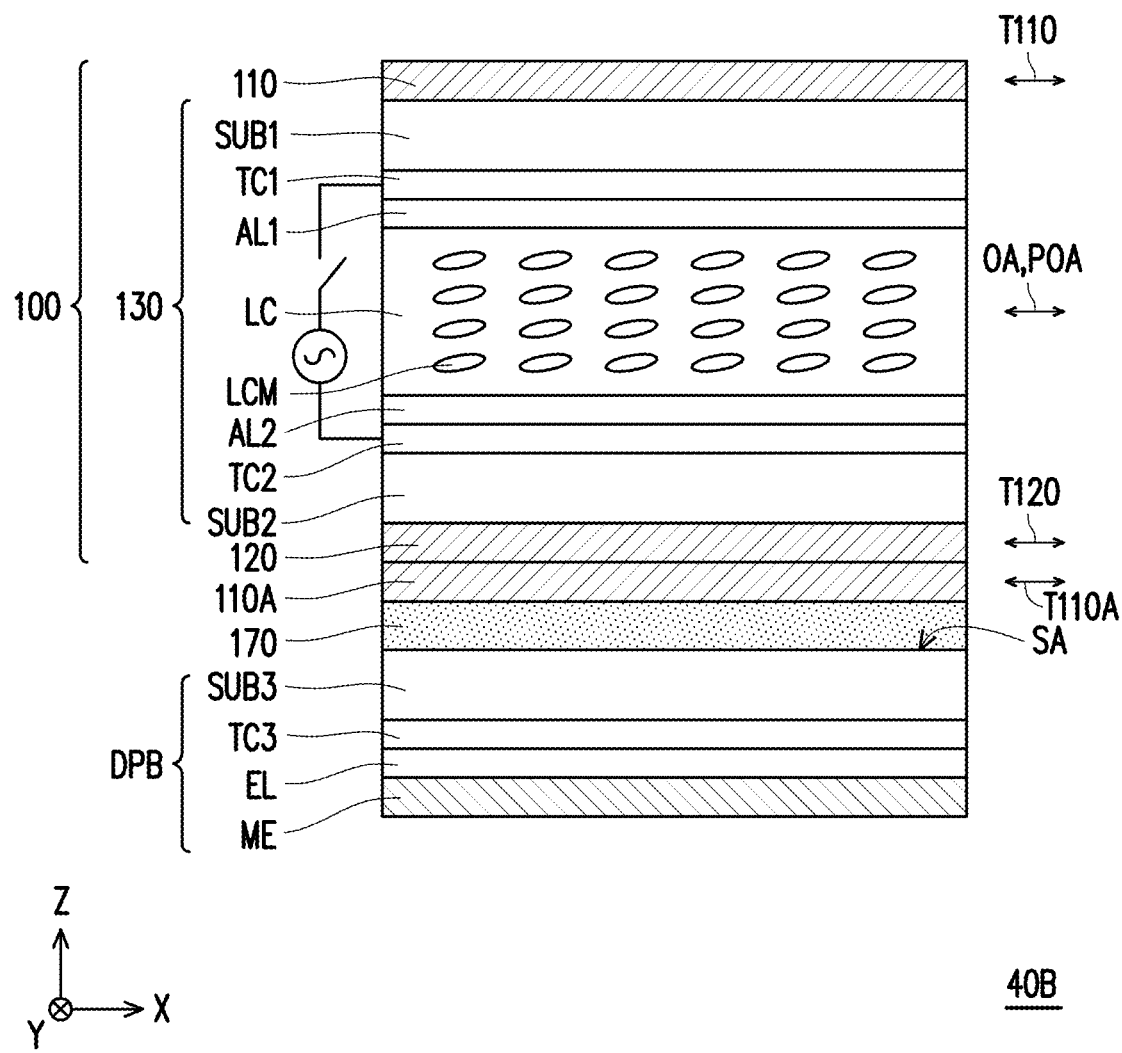

In another embodiment, referring to the viewing angle switchable display module 40B in FIG. 10E, to further avoid the peep, an additional absorptive polarizer 110A may be disposed between the reflective polarizer 120 and the quarter wave plate 170 because generally the polarization rate of the absorptive polarizer is better than the reflective polarizer.

In another embodiment, the viewing angle switchable device 100 of the viewing angle switchable display module 40 may be replaced by the viewing angle switchable device 200 of FIG. 2, the viewing angle switchable device 300 of FIG. 3, the viewing angle switchable device 400 of FIG. 4A, or the viewing angle switchable device 500 of FIG. 5. In still another embodiment, the viewing angle switchable display module 40 may adopt the viewing angle switchable device 100 of FIG. 1 (or the viewing angle switchable device 200 of FIG. 2, the viewing angle switchable device 400 of FIG. 4A, or the viewing angle switchable device 500 of FIG. 5), and the viewing angle switchable display module 40 may further include the compensation element 150 of FIG. 3, wherein the compensation element 150, the organic light-emitting display panel DPB, and the viewing angle switchable device 100 are overlapped with each other. For example, the compensation element 150 and the viewing angle switchable device 100 may be sequentially disposed on the organic light-emitting display panel DPB, or positions of the compensation element 150 and the viewing angle switchable device 100 may be exchanged. The following embodiments can be improved as described in this paragraph, and will not be repeated hereinafter.

FIG. 11 to FIG. 18 are cross-sectional views schematically illustrating viewing angle switchable display modules according to a fifth embodiment to a twelfth embodiment of the invention.

Figure 11:
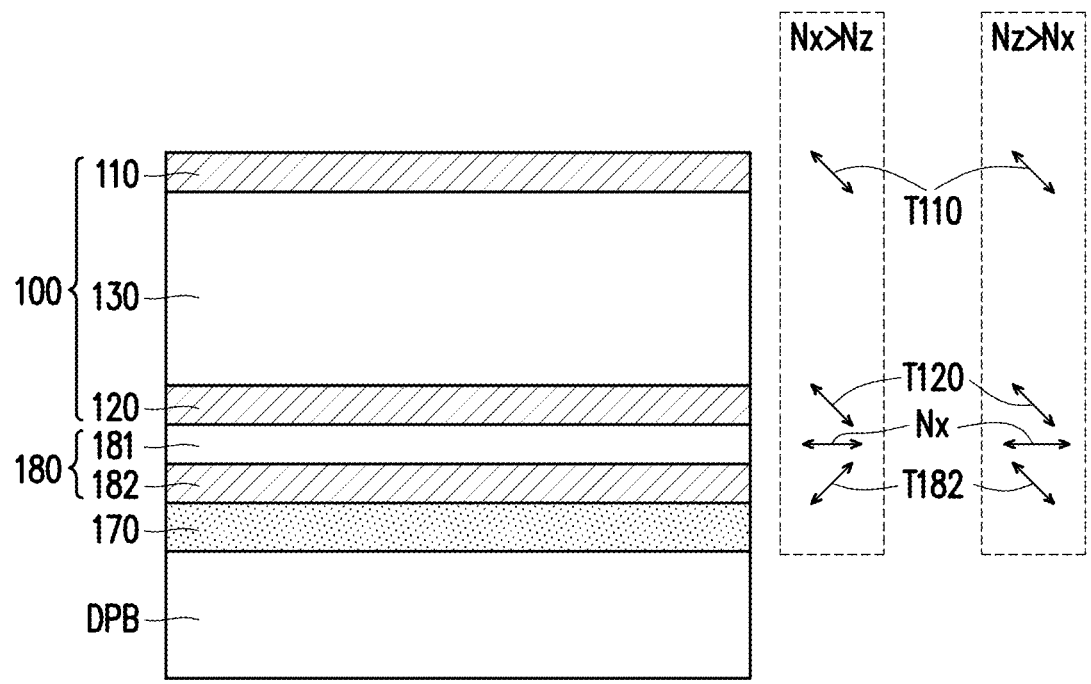
FIG. 11 to FIG. 18 are cross-sectional views schematically illustrating viewing angle switchable display modules according to a fifth embodiment to a twelfth embodiment of the invention.

Referring to FIG. 11, main differences between the viewing angle switchable display module 50 of the fifth embodiment of the invention and the viewing angle switchable display module 40 of FIG. 10A are as follows. The viewing angle switchable display module 50 further includes a viewing angle reduction optical film (e.g. a polarized type viewing angle control element 180) to further improve the peep-avoiding effect. The viewing angle reduction optical film may be a louver film, such as an advanced light control film (ALCF). Alternatively, the viewing angle reduction optical film may be the polarized type viewing angle control element 180 shown in FIG. 11. In the embodiment, the polarized type viewing angle control element 180 is located between the viewing angle switchable device 100 and the quarter wave plate 170. In another embodiment, the viewing angle switchable device 100 may be located between the polarized type viewing angle control element 180 and the quarter wave plate 170.

In the embodiment, the polarized type viewing angle control element 180 includes a biaxial compensation film 181 and a polarizer 182, wherein the biaxial compensation film 181 is located between the polarizer 182 and the viewing angle switchable device 100. Specifically, when the polarized type viewing angle control element 180 is located between the viewing angle switchable device 100 and the quarter wave plate 170, the biaxial compensation film 181 is located between the polarizer 182 and the reflective polarizer 120 of the viewing angle switchable device 100.

Refractive indices of three principal axes of the biaxial compensation film 181 include Nx, Ny, and Nz, wherein Nz is parallel to a thickness direction of the biaxial compensation film 181, and every two of Nx, Ny, and Nz are perpendicular to each other. In addition, an angle between Nx and any one of the transmission axis T110 of the absorptive polarizer 110, the transmission axis T120 of the reflective polarizer 120, and a transmission axis T182 of the polarizer 182 is 45 degrees, and an angle between Ny and any one of the transmission axis T110 of the absorptive polarizer 110, the transmission axis T120 of the reflective polarizer 120, and the transmission axis T182 of the polarizer 182 is 45 degrees. If Nx>Nz, the transmission axis T182 of the polarizer 182 is perpendicular to the transmission axis T110 of the absorptive polarizer 110 and the transmission axis T120 of the reflective polarizer 120. By contrast, if Nz>Nx, the transmission axis T182 of the polarizer 182 is parallel to the transmission axis T110 of the absorptive polarizer 110 and the transmission axis T120 of the reflective polarizer 120. In the polarized type viewing angle control element 180, the biaxial compensation film 181 provides an in-plane retardation within a range from 200 nm to 300 nm, and the biaxial compensation film 181 provides an out-of-plane retardation within a range from 300 nm to 800 nm. The in-plane retardation of the biaxial compensation film 181 equals to (Nx−Ny)*D, wherein D represents the thickness of the biaxial compensation film 181. The out-of-plane retardation of the biaxial compensation film 181 equals to [(Nx+Ny)/2−Nz]*D.

In another embodiment, the viewing angle switchable device 100 may further include other layers according to needs. For example, the viewing angle switchable device 100 may further include at least one compensation film (not shown). When the viewing angle switchable device 100 includes one compensation film, the compensation film may be disposed between the electrically controlled viewing angle switching element 130 and the reflective polarizer 120 or between the electrically controlled viewing angle switching element 130 and the absorptive polarizer 110. Besides, the compensation film may be a C-type (e.g. negative C-type) plate, an O-type plate, an A-type plate (preferably, two A-type plates), a biaxial plate or a composite plate constructed by at least two of the above four types of plates. On the other hand, when the viewing angle switchable device 100 includes two or more compensation films, the two or more compensation films may be disposed between the electrically controlled viewing angle switching element 130 and the reflective polarizer 120 and/or between the electrically controlled viewing angle switching element 130 and the absorptive polarizer 110. Besides, each of the compensation films may be a C-type (e.g. negative C-type) plate, an O-type plate, an A-type plate, a biaxial plate or a composite plate constructed by at least two of the above four types of plates. The following embodiments can be improved as described in this paragraph, and will not be repeated hereinafter.

Figure 12:
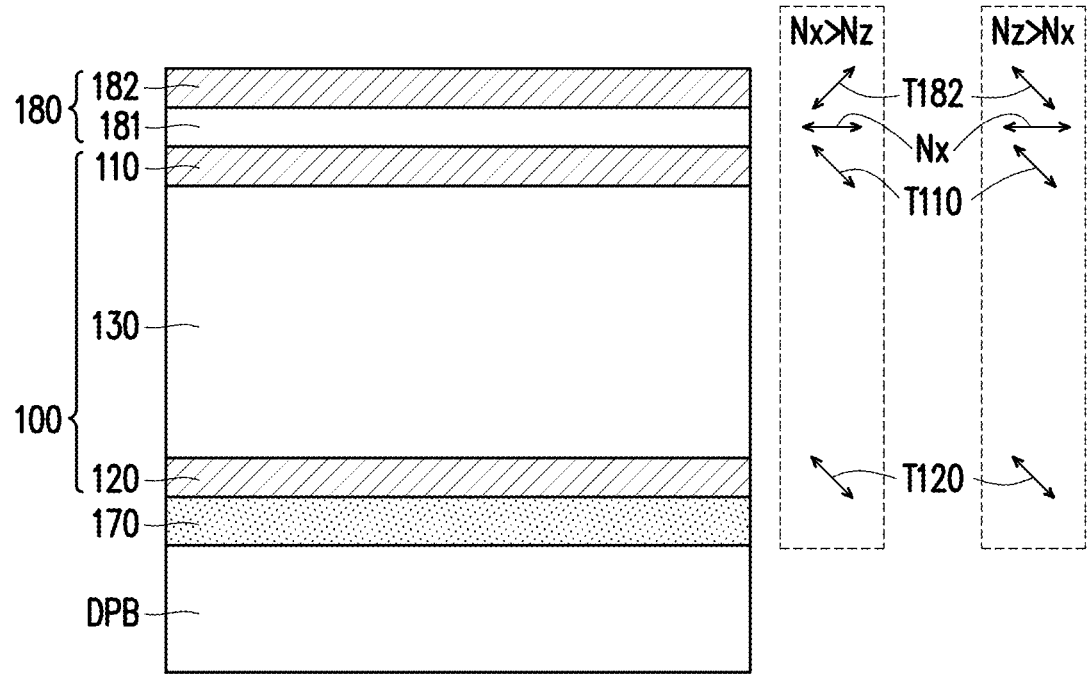

Referring to FIG. 12, main differences between the viewing angle switchable display module 50A of the sixth embodiment of the invention and the viewing angle switchable display module 50 of FIG. 11 are as follows. In the viewing angle switchable display module 50A, the viewing angle switchable device 100 is located between the polarized type viewing angle control element 180 and the quarter wave plate 170. Moreover, the biaxial compensation film 181 is located between the polarizer 182 and the absorptive polarizer 110 of the viewing angle switchable device 100. The following embodiments can be improved as described in this paragraph (switch positions of the viewing angle switchable device and the polarized type viewing angle control element), and will not be repeated hereinafter.

Figure 13:
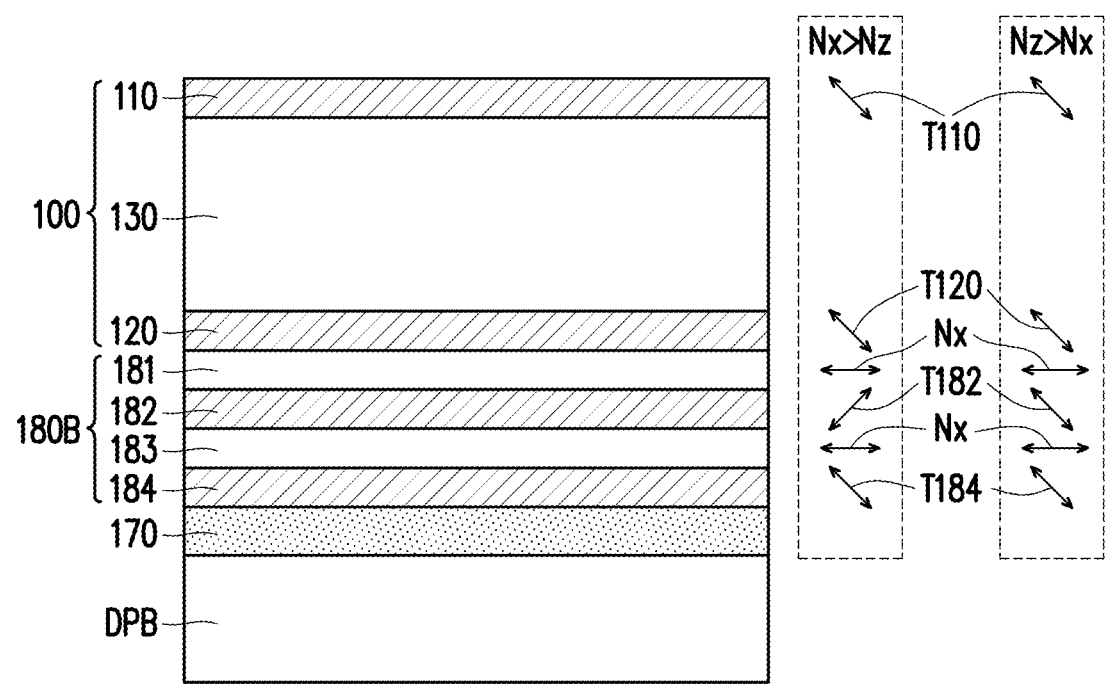

Referring to FIG. 13, main differences between the viewing angle switchable display module 50B of the seventh embodiment of the invention and the viewing angle switchable display module 50 of FIG. 11 are as follows. In the viewing angle switchable display module 50B, the polarized type viewing angle control element 180B includes not only the biaxial compensation film 181 and the polarizer 182 but also a biaxial compensation film 183 and a polarizer 184, wherein the biaxial compensation films and the polarizers are alternately arranged. Specifically, when the polarized type viewing angle control element 180B is located between the viewing angle switchable device 100 and the quarter wave plate 170, the biaxial compensation film 181, the polarizer 182, the biaxial compensation film 183 and the polarizer 184 are sequentially disposed on a side of the viewing angle switchable device 100 closer to the quarter wave plate 170. In another embodiment, when the viewing angle switchable device 100 is located between the polarized type viewing angle control element 180B and the quarter wave plate 170, the biaxial compensation film 181, the polarizer 182, the biaxial compensation film 183 and the polarizer 184 are sequentially disposed on a side of the viewing angle switchable device 100 away from the quarter wave plate 170.

An angle between a transmission axis T184 of the polarizer 184 and Nx of the biaxial compensation film 183 is 45 degrees as well. If Nx>Nz, the transmission axis T184 of the polarizer 184 and the transmission axis T182 of the polarizer 182 are perpendicular to each other, and the transmission axis T184 of the polarizer 184 and the transmission axis T120 of the reflective polarizer 120 are parallel to each other. By contrast, if Nz>Nx, the transmission axis T184 of the polarizer 184, the transmission axis T182 of the polarizer 182, and the transmission axis T120 of the reflective polarizer 120 are parallel to one another.

Figure 14:
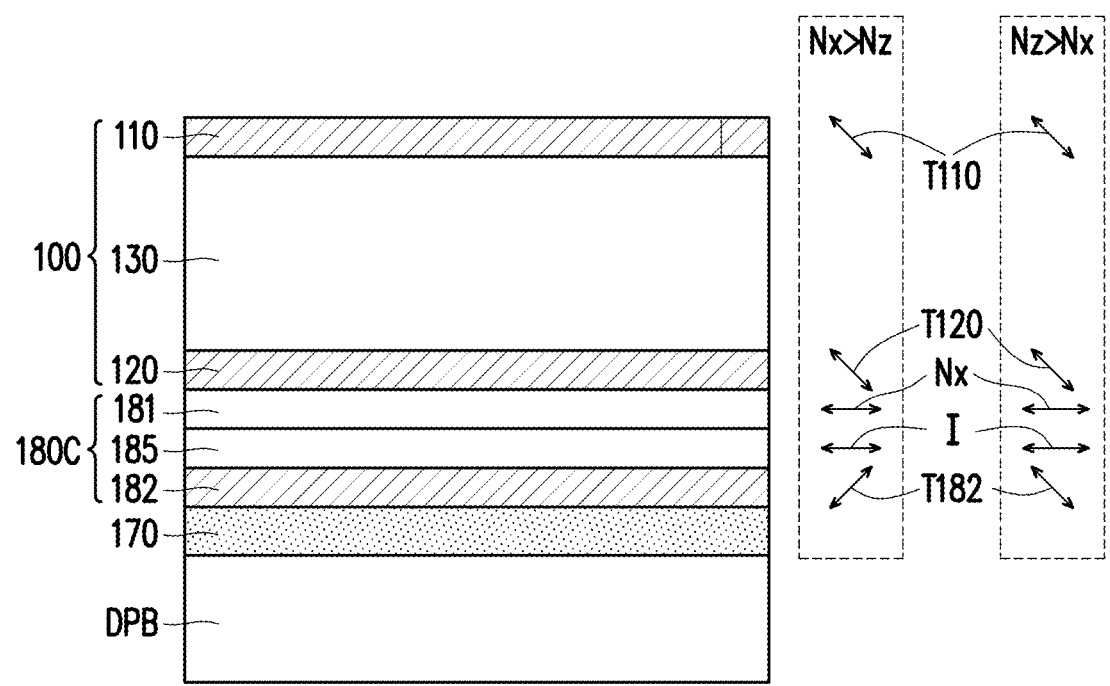

Referring to FIG. 14, main differences between the viewing angle switchable display module 50C of the eighth embodiment of the invention and the viewing angle switchable display module 50 of FIG. 11 are as follows. In the viewing angle switchable display module 50C, the polarized type viewing angle control element 180C includes not only the biaxial compensation film 181 and the polarizer 182 but also an A-plate 185, wherein the A-plate 185 is disposed between the viewing angle switchable device 100 and the polarizer 182 and overlaps the biaxial compensation film 181. For instance, the A-plate 185 may be located between the biaxial compensation film 181 and the polarizer 182 (as shown in FIG. 14), or the biaxial compensation film 181 may be located between the A-plate 185 and the polarizer 182. In addition, an optical axis I of the A-plate 185 is parallel to Nx of the biaxial compensation film 181. In the embodiment, the sum of the in-plane retardations provided by the biaxial compensation film 181 and by the A-plate 185 falls within a range from 200 nm to 300 nm, and the sum of the out-of-plane retardations provided by the biaxial compensation film 181 and by the A-plate 185 falls within a range from 300 nm to 800 nm.

In another embodiment, the A-plate 185 may be replaced by a C-plate, the sum of in-plane retardations provided by the biaxial compensation film and the C-plate falls within a range from 200 nm to 300 nm, and the sum of out-of-plane retardations provided by the biaxial compensation film and the C-plate falls within a range from 300 nm to 800 nm. In yet another embodiment, the A-plate 185 may be replaced by the combination of the A-plate and the C-plate, the sum of in-plane retardations provided by the biaxial compensation film and the combination of the A-plate and the C-plate falls within a range from 200 nm to 300 nm, and the sum of out-of-plane retardations provided by the biaxial compensation film and the combination of the A-plate and the C-plate falls within a range from 300 nm to 800 nm.

Figure 15:
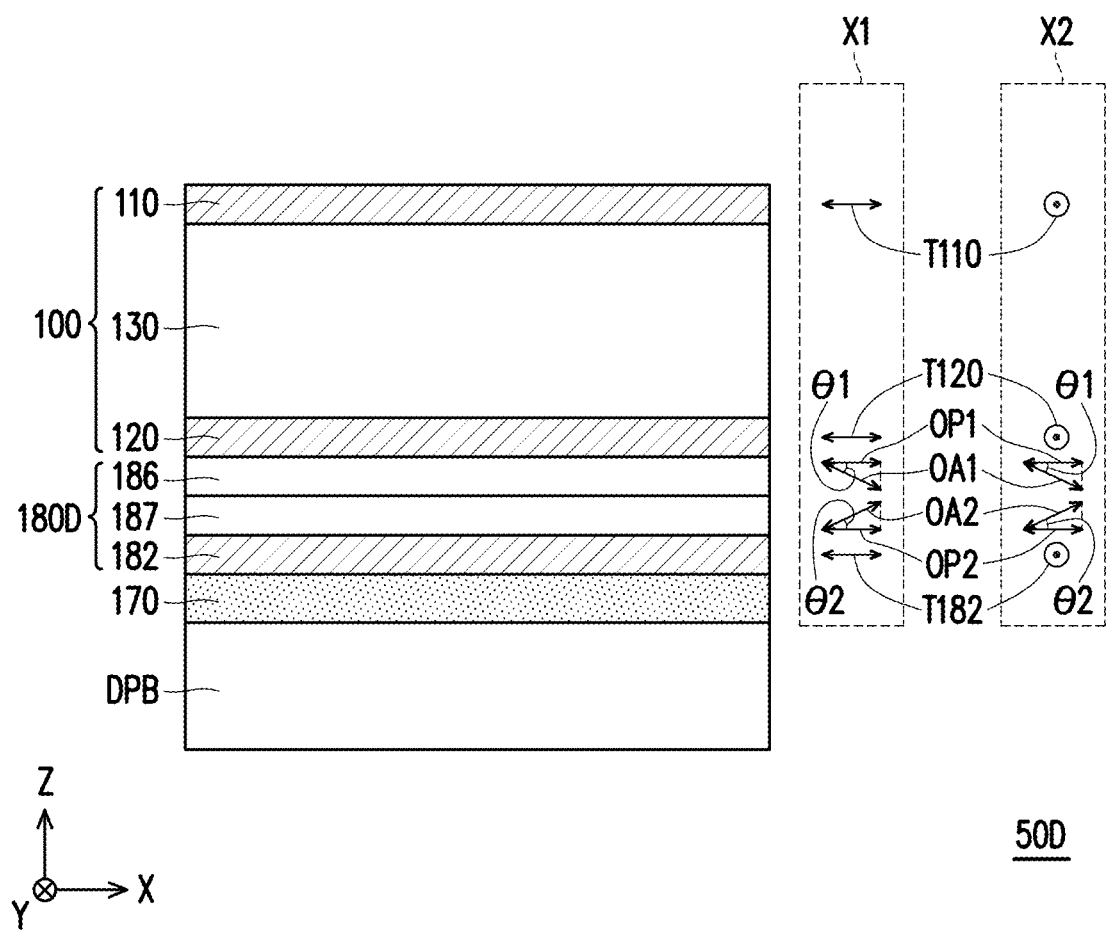

Referring to FIG. 15, main differences between the viewing angle switchable display module 50D of the ninth embodiment of the invention and the viewing angle switchable display module 50 of FIG. 11 are as follows. In the viewing angle switchable display module 50D, the polarized type viewing angle control element 180D includes not only the polarizer 182 but also a first O-plate compensation film 186 having a first optical axis OA1 and a second O-plate compensation film 187 overlapped with the first O-plate compensation film 186 and having a second optical axis OA2. The first O-plate compensation film 186 and the second O-plate compensation film 187 are located between the polarizer 182 and the viewing angle switchable device 100. In the embodiment, the second O-plate compensation film 187 is located between the first O-plate compensation film 186 and the polarizer 182. In another embodiment, the first O-plate compensation film 186 may be located between the second O-plate compensation film 187 and the polarizer 182.

A transmission axis T182 of the polarizer 182 is parallel to the transmission axis T110 of the absorptive polarizer 110 and the transmission axis T120 of the reflective polarizer 120, an orthogonal projection OP1 of the first optical axis OA1 on the polarizer 182 is parallel or perpendicular to the transmission axis T182 of the polarizer 182. The second optical axis OA2 and the first optical axis OA1 have opposite inclination directions, and an orthogonal projection OP2 of the second optical axis OA2 on the polarizer 182 is parallel or perpendicular to the transmission axis T182 of the polarizer 182. Specifically, as shown in a dash line frame X1, the transmission axis T110, the transmission axis T120, and the transmission axis T182 may respectively extend in the first direction X. In addition, the orthogonal projection OP1 of the first optical axis OA1 on the polarizer 182 and the orthogonal projection OP2 of the second optical axis OA2 on the polarizer 182 are parallel to the transmission axis T110, the transmission axis T120, and the transmission axis T182. Alternatively, as shown in a dash line frame X2, the transmission axis T110, the transmission axis T120, and the transmission axis T182 may respectively extend in the second direction Y. In addition, the orthogonal projection OP1 of the first optical axis OA1 on the polarizer 182 and the orthogonal projection OP2 of the second optical axis OA2 on the polarizer 182 are perpendicular to the transmission axis T110, the transmission axis T120, and the transmission axis T182.

As the orthogonal projection OP1 of the first optical axis OA1 and the orthogonal projection OP2 of the second optical axis OA2 are parallel to the first direction X, the polarized type viewing angle control element 180D is able to limit the viewing angle in the second direction Y. In another embodiment, the orthogonal projection OP1 of the first optical axis OA1 and the orthogonal projection OP2 of the second optical axis OA2 may be parallel to the second direction Y. Accordingly, the polarized type viewing angle control element 180D may limit the viewing angle in the first direction X.

An acute angle included between the first optical axis OA1 and the polarizer 182 (i.e., an acute angle θ1 included between the first optical axis OA1 and the orthogonal projection OP1) is the same as or similar to an acute angle included between the second optical axis OA2 and the polarizer 182 (i.e., an acute angle θ2 included between the second optical axis OA2 and the orthogonal projection OP2). The viewing angle of the polarized type viewing angle control element 180D may become narrowed as the acute angle becomes greater. Besides, as the acute angle becomes greater, the polarized type viewing angle control element 180D gradually shows light leakage at a large angle. As the acute angle becomes smaller, the viewing angle of the polarized type viewing angle control element 180D gradually becomes broader. Hence, by keeping the acute angle within a range from 20° to 50°, the polarized type viewing angle control element 180D may have a narrowed viewing angle and have less light leakage at a large angle. Specifically, in the embodiment, the acute angle included between the first optical axis OA1 and the polarizer 182 (i.e., the acute angle θ1 included between the first optical axis OA1 and the orthogonal projection OP1) falls within the range from 20° to 50°, and the acute angle included between the second optical axis OA2 and the polarizer 182 (i.e., the acute angle θ2 included between the second optical axis OA2 and the orthogonal projection OP2) falls within the range from 20° to 50°. In addition, a difference between the acute angle θ1 and the acute angle θ2 is no more than 5 degrees.

In addition, the viewing angle of the polarized type viewing angle control element 180D may be narrowed as the phase retardation value of the O-plate compensation film increases. Besides, as the phase retardation value of the O-plate compensation film increases, the polarized type viewing angle control element 180D gradually shows some light leakage at a large angle. As the phase retardation value of the O-plate compensation film decreases, the viewing angle of the polarized type viewing angle control element 180D gradually becomes broader. Hence, by keeping the phase retardation value within a range from 100 nm to 400 nm, the polarized type viewing angle control element 180D may have a narrowed viewing angle and have no light leakage at a large angle. Specifically, in the embodiment, the phase retardation value of the first O-plate compensation film 186 falls within the range from 100 nm to 400 nm, and the phase retardation value of the second O-plate compensation 187 falls within the range from 100 nm to 400 nm. In addition, a difference between the phase retardation value of the first O-plate compensation film 186 and the phase retardation value of the second O-plate compensation film 187 is no more than 50 nm.

In another embodiment, the polarized type viewing angle control element 180D may further include other layers according to needs. For example, the polarized type viewing angle control element 180D may further include an adhesive layer (not shown). The adhesive layer (e.g. an optical clear adhesive) is located between the first O-plate compensation film 186 and the second O-plate compensation film 187. In yet another embodiment, the polarized type viewing angle control element 180D may further include another polarizer having a transmission axis parallel to the transmission axis T182 of the polarizer 182. The another polarizer may be disposed adjacent to the polarizer 182 (e.g. the another polarizer may be located between the second O-plate compensation film 187 and the polarizer 182) to improve the light filtering effect at the side where the polarizer 182 is located. The following embodiments can be improved as described in this paragraph, and will not be repeated hereinafter.

Figure 16:
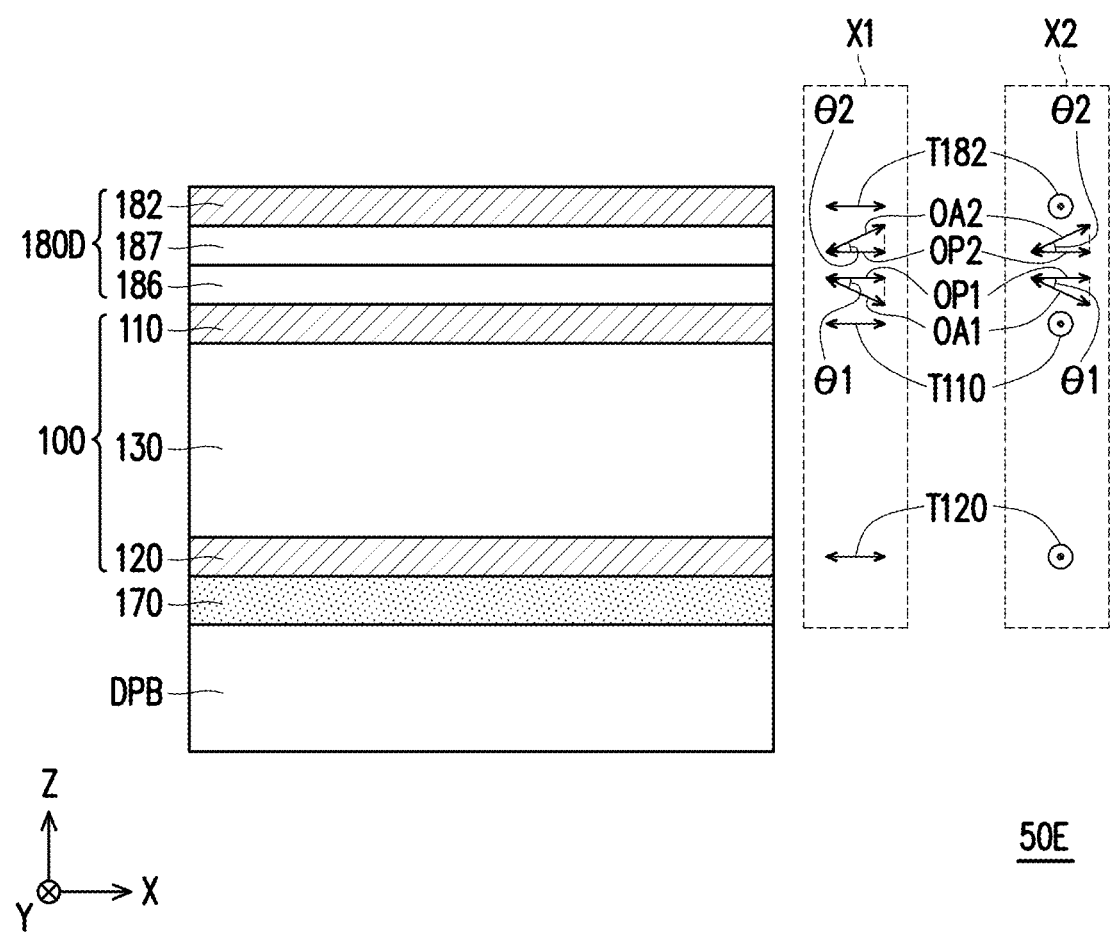

Referring to FIG. 16, main differences between the viewing angle switchable display module 50E of the tenth embodiment of the invention and the viewing angle switchable display module 50D of FIG. 15 are as follows. In the viewing angle switchable display module 50E, the viewing angle switchable device 100 is located between the polarized type viewing angle control element 180D and the quarter wave plate 170. In the embodiment, the second O-plate compensation film 187 is located between the first O-plate compensation film 186 and the polarizer 182. In another embodiment, the first O-plate compensation film 186 may be located between the second O-plate compensation film 187 and the polarizer 182. The following embodiments can be improved as described in this paragraph (switch positions of the viewing angle switchable device and the polarized type viewing angle control element and/or switch positions of the first O-plate compensation film and the second O-plate compensation film), and will not be repeated hereinafter.

Figure 17:
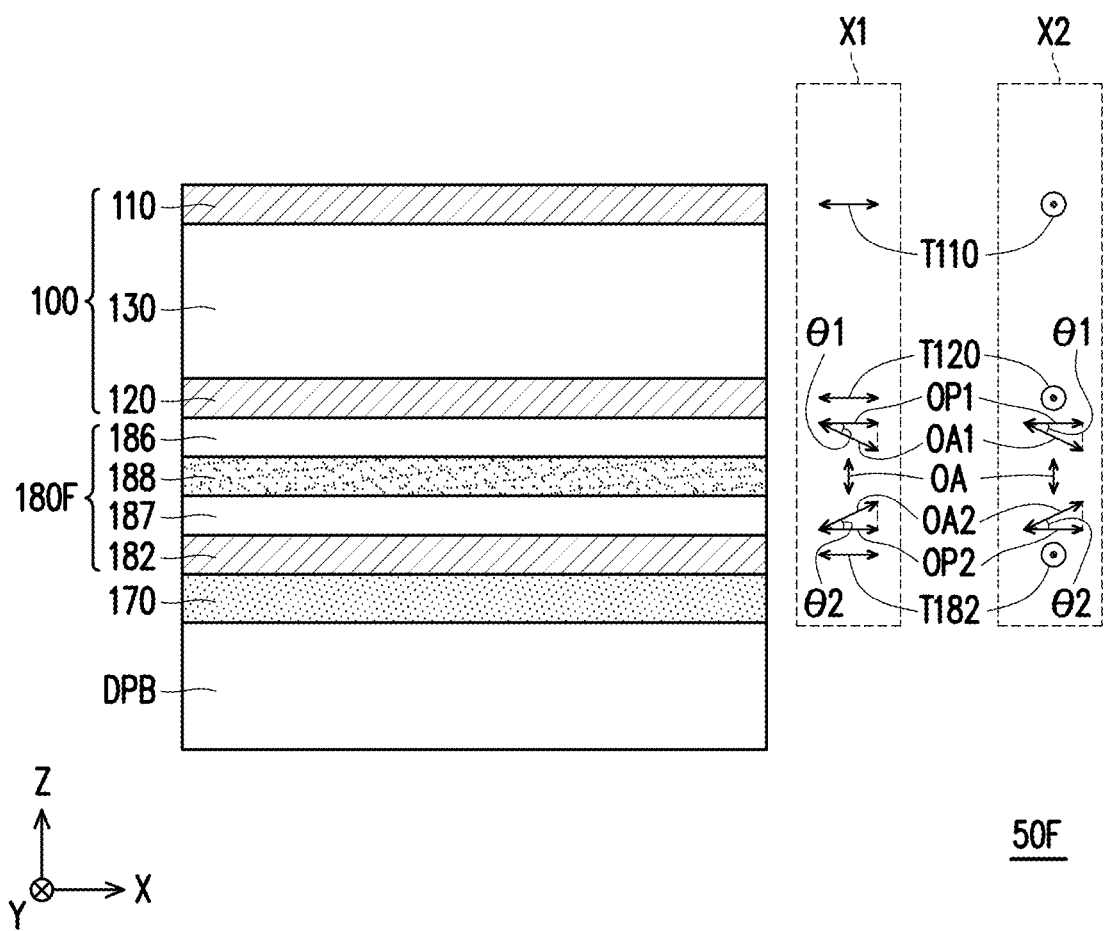

Referring to FIG. 17, main differences between the viewing angle switchable display module 50F of the eleventh embodiment of the invention and the viewing angle switchable display module 50D of FIG. 15 are as follows. In the viewing angle switchable display module 50F, the polarized type viewing angle control element 180F includes not only the first O-plate compensation film 186, the second O-plate compensation film 187, and the polarizer 182 but also a compensation film 188. The compensation film 188 may be located between the first O-plate compensation film 186 and the second O-plate compensation film 187, between the first O-plate compensation film 186 and the polarizer 182, or between the second O-plate compensation film 187 and the polarizer 182. In the embodiment, the compensation film 188 is located between the first O-plate compensation film 186 and the second O-plate compensation film 187.

The compensation film 188 may be a C-plate compensation film or an O-plate compensation film. Taking the compensation film 188 as a C-plate compensation film as an example, the optical axis OA of the compensation film C is parallel to a thickness direction of the polarized type viewing angle control element 180F (the direction Z). The compensation film 188 may serve to modify a light filtering range and the transmittance. For example, the compensation film 188 may offer an out-of-plane retardation of 150 nm, so as to further facilitate the anti-peep effect. It should be noted that, while FIG. 17 only illustrates one compensation film 188, the number of the compensation film 188 may be modified based on needs, and is not limited to the illustration of FIG. 17. The modification is applicable to all the following embodiments. Therefore, details in this regard will not be repeated in the following.

Figure 18:
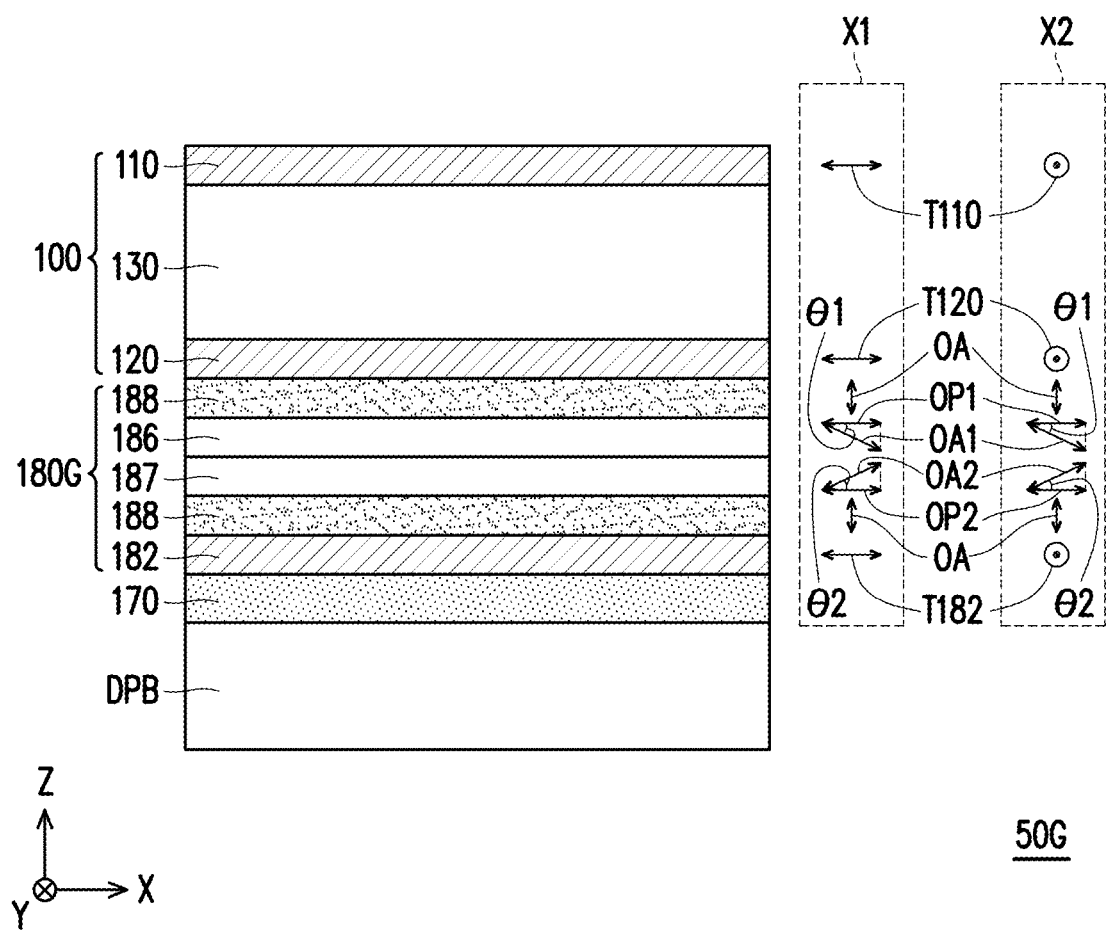

Referring to FIG. 18, main differences between the viewing angle switchable display module 50G of the twelfth embodiment of the invention and the viewing angle switchable display module 50D of FIG. 15 are as follows. In the viewing angle switchable display module 50G, the polarized type viewing angle control element 180G includes not only the first O-plate compensation film 186, the second O-plate compensation film 187, and the polarizer 182 but also two compensation films 188. The compensation films 188 are respectively located between the polarized type viewing angle control device 100 and the first O-plate compensation film 186 and between the second O-plate compensation film 187 and the polarizer 182. The two compensation films 188 may be C-plate compensation films or O-plate compensation films. Besides, the number of the compensation films 188 may be modified based on needs, and is not limited to the illustration of FIG. 18. The modification is applicable to all the following embodiments. Therefore, details in this regard will not be repeated in the following.

In summary, the embodiments of the invention have at least one of the following advantages or effects. In the embodiments of the invention, an inclination direction of the liquid crystal molecules in the viewing angle switchable device is controlled by changing a potential difference between the two transparent conductive layers. A phase delay is caused in the light beam entering the viewing angle switchable device by a large angle, and this light beam thus cannot pass through the absorptive polarizer. Therefore, the range of the viewing angle is narrowed and a peep is substantially avoided. Moreover, by configuring at least one compensation film, the viewing angle switchable device may mitigate the large angle light leakage and enlarge a peep-avoiding range on azimuth. Furthermore, by configuring the reflective polarizer, the environmental light beam entering the viewing angle switchable device by a large angle is reflected by the reflective polarizer to enhance the reflection of the environmental light beam by the viewing angle switchable device. By enhancing the reflection of the environmental light beam, a contrast of large angle light leakage is decreased, so as to help avoid a peep from a large angle. A plurality of openings may be formed on the reflective polarizer to block the large angle light leakage, so as to further improve the peep-avoiding effect. The viewing angle switchable display module employing the viewing angle switchable device may be switched between the general display mode and the peep-avoiding mode in an electric control manner, and a backlight module may be optionally selected for the non-self-luminous display panel used with the viewing angle switchable display module. By disposing a quarter wave plate between an organic light-emitting display panel and a viewing angle switchable device, the display image is prevented from being interfered by the environmental light beam. Also, the contrast of the large angle light leakage is decreased in the peep-avoiding mode, and thus a peep is further avoided. In some embodiments, a viewing angle reduction optical film (e.g. a louver film or a polarized type viewing angle control element) may be further disposed to overlap with the viewing angle switchable device so as to further improve the peep-avoiding effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A viewing angle switchable display module, comprising:
   an organic light-emitting display panel;
   a viewing angle switchable device, disposed on a display surface of the organic light-emitting display panel and comprising:
      an absorptive polarizer;
      a reflective polarizer, disposed at a side of the absorptive polarizer, wherein a transmission axis of the reflective polarizer is parallel to a transmission axis of the absorptive polarizer;
      an electrically controlled viewing angle switching element, disposed between the absorptive polarizer and the reflective polarizer and comprising two conductive layers and a liquid crystal layer disposed between the two conductive layers, wherein the liquid crystal layer comprises a plurality of liquid crystal molecules, and when there is a potential difference between the two conductive layers, an orthogonal projection of an optical axis of each of the plurality of liquid crystal molecules on the absorptive polarizer is parallel to or perpendicular to the transmission axis of the absorptive polarizer and the transmission axis of the reflective polarizer; and
      a compensation film, disposed between the absorptive polarizer and the reflective polarizer and overlapped with the electrically controlled viewing angle switching element, wherein the compensation film is an A-type plate, an O-type plate, a C-type plate, a biaxial plate or a composite plate constructed by at least two of the above four types of plates, an out-of-plane retardation of the compensation film is within a range from 200 nm to 700 nm, and an in-plane retardation of the compensation film is less than 200 nm; and
   a quarter wave plate, disposed between the organic light-emitting display panel and the viewing angle switchable device.

2. The viewing angle switchable display module as claimed in claim 1, further comprising:
   a compensation element, overlapped with the organic light-emitting display panel and the viewing angle switchable device,
   wherein the compensation element comprises a compensation film and an absorptive polarizer, wherein a transmission axis of the absorptive polarizer of the compensation element is parallel to the transmission axis of the absorptive polarizer and the transmission axis of the reflective polarizer.

3. The viewing angle switchable display module as claimed in claim 2, wherein the compensation film of the compensation element is an A-type plate, an O-type plate, a C-type plate, a biaxial plate or a composite plate constructed by at least two of the above four types of plates.

4. The viewing angle switchable display module as claimed in claim 1, further comprising:
   a compensation element, overlapped with the organic light-emitting display pane and the viewing angle switchable device,
   wherein the compensation element comprises a compensation film and an absorptive polarizer, wherein a transmission axis of the absorptive polarizer of the compensation element is parallel to the transmission axis of the absorptive polarizer and the transmission axis of the reflective polarizer.

5. The viewing angle switchable display module as claimed in claim 4, wherein the compensation film of the compensation element is an A-type plate, an O-type plate, a C-type plate or a composite plate constructed by at least two of the above three types of plates.

6. The viewing angle switchable display module as claimed in claim 1,
   wherein the reflective polarizer has at least one opening, and the viewing angle switchable device further comprises another absorptive polarizer, and
   wherein the reflective polarizer is disposed between the another absorptive polarizer and the electrically controlled viewing angle switching element, and a transmission axis of the another absorptive polarizer is parallel to the transmission axis of the absorptive polarizer and the transmission axis of the reflective polarizer.

7. A viewing angle switchable display module, comprising:
   an organic light-emitting display panel;
   a viewing angle switchable device, disposed on a display surface of the organic light-emitting display panel and comprising:
      an absorptive polarizer;
      a reflective polarizer, disposed at a side of the absorptive polarizer, wherein a transmission axis of the reflective polarizer is parallel to a transmission axis of the absorptive polarizer; and
      an electrically controlled viewing angle switching element, disposed between the absorptive polarizer and the reflective polarizer and comprising two conductive layers and a liquid crystal layer disposed between the two conductive layers, wherein the liquid crystal layer comprises a plurality of liquid crystal molecules, and when there is a potential difference between the two conductive layers, an orthogonal projection of an optical axis of each of the plurality of liquid crystal molecules on the absorptive polarizer is parallel to or perpendicular to the transmission axis of the absorptive polarizer and the transmission axis of the reflective polarizer;
   a quarter wave plate, disposed between the organic light-emitting display panel and the viewing angle switchable device; and
   a polarized type viewing angle control element, wherein the polarized type viewing angle control element is located between the viewing angle switchable device and the quarter wave plate, or the viewing angle switchable device is located between the polarized type viewing angle control element and the quarter wave plate,
   wherein the polarized type viewing angle control element comprises:
      a biaxial compensation film; and
      a polarizer, wherein the biaxial compensation film is located between the polarizer and the viewing angle switchable device, and
   wherein refractive indices of three principal axes of the biaxial compensation film comprise Nx, Ny, and Nz, wherein Nz is parallel to a thickness direction of the biaxial compensation film, every two of Nx, Ny, and Nz are perpendicular to each other, an angle between Nx and any one of the transmission axis of the absorptive polarizer, the transmission axis of the reflective polarizer, and a transmission axis of the polarizer is 45 degrees, and an angle between Ny and any one of the transmission axis of the absorptive polarizer, the transmission axis of the reflective polarizer, and the transmission axis of the polarizer is 45 degrees.

8. The viewing angle switchable display module as claimed in claim 7, wherein Nx>Nz, and the transmission axis of the polarizer is perpendicular to the transmission axis of the absorptive polarizer and the transmission axis of the reflective polarizer.

9. The viewing angle switchable display module as claimed in claim 7, wherein Nz>Nx, and the transmission axis of the polarizer is parallel to the transmission axis of the absorptive polarizer and the transmission axis of the reflective polarizer.

10. The viewing angle switchable display module as claimed in claim 7, wherein the polarized type viewing angle control element comprises a plurality of the biaxial compensation films and a plurality of the polarizers, and the biaxial compensation films and the polarizers are alternately arranged.

11. The viewing angle switchable display module as claimed in claim 7, wherein the polarized type viewing angle control element further comprises an A-plate, a C-plate, or a combination of the A-plate and the C-plate, the A-plate, the C-plate, or the combination of the A-plate and the C-plate is located between the viewing angle switchable device and the polarizer and overlaps the biaxial compensation film.

12. The viewing angle switchable display module as claimed in claim 7, wherein an in-plane retardation of the polarized type viewing angle control element is within a range from 200 nm to 300 nm, and an out-of-plane retardation of the polarized type viewing angle control element is within a range from 300 nm to 800 nm.

13. A viewing angle switchable display module, comprising:
an organic light-emitting display panel;
a viewing angle switchable device, disposed on a display surface of the organic light-emitting display panel and comprising:
an absorptive polarizer;
a reflective polarizer, disposed at a side of the absorptive polarizer, wherein a transmission axis of the reflective polarizer is parallel to a transmission axis of the absorptive polarizer; and
an electrically controlled viewing angle switching element, disposed between the absorptive polarizer and the reflective polarizer and comprising two conductive layers and a liquid crystal layer disposed between the two conductive layers, wherein the liquid crystal layer comprises a plurality of liquid crystal molecules, and when there is a potential difference between the two conductive layers, an orthogonal projection of an optical axis of each of the plurality of liquid crystal molecules on the absorptive polarizer is parallel to or perpendicular to the transmission axis of the absorptive polarizer and the transmission axis of the reflective polarizer;
a quarter wave plate, disposed between the organic light-emitting display panel and the viewing angle switchable device; and
a polarized type viewing angle control element, wherein the polarized type viewing angle control element is located between the viewing angle switchable device and the quarter wave plate, or the viewing angle switchable device is located between the polarized type viewing angle control element and the quarter wave plate,
wherein the polarized type viewing angle control element comprises:
a first O-plate compensation film, having a first optical axis;
a second O-plate compensation film, overlapped with the first O-plate compensation film and having a second optical axis; and
a polarizer, wherein the first O-plate compensation film and the second O-plate compensation film are located between the polarizer and the viewing angle switchable device, a transmission axis of the polarizer is parallel to the transmission axis of the absorptive polarizer and the transmission axis of the reflective polarizer, an orthogonal projection of the first optical axis on the polarizer is parallel or perpendicular to the transmission axis of the polarizer, the second optical axis and the first optical axis have opposite inclination directions, and an orthogonal projection of the second optical axis on the polarizer is parallel or perpendicular to the transmission axis of the polarizer.

14. The viewing angle switchable display module as claimed in claim 13, wherein an acute angle included between the first optical axis and the polarizer is in a range from 20° to 50°, an acute angle included between the second optical axis and the polarizer is in a range from 20° to 50°, and a difference between the acute angle included between the first optical axis and the polarizer and the acute angle included between the second optical axis and the polarizer is no more than 5°.

15. The viewing angle switchable display module as claimed in claim 13, wherein a phase retardation value of the first O-plate compensation film is in a range from 100 nm to 400 nm, a phase retardation value of the second O-plate compensation film is in a range from 100 mu to 400 nm, and a difference between the phase retardation value of the first O-plate compensation film and the phase retardation value of the second O-plate compensation film is no more than 50 nm.

16. The viewing angle switchable display module as claimed in claim 13, wherein the polarized type viewing angle control element further comprises:
an adhesive layer, located between the first O-plate compensation film and the second O-plate compensation film.

17. The viewing angle switchable display module as claimed in claim 13, wherein the polarized type viewing angle control element further comprises:
a compensation film, located between the first O-plate compensation film and the second O-plate compensation film, between the first O-plate compensation film and the polarizer, or between the second O-plate compensation film and the polarizer.

18. The viewing angle switchable display module as claimed in claim 17, wherein the compensation film is a C-plate compensation film or an O-plate compensation film.

19. The viewing angle switchable display module as claimed in claim 1, wherein the reflective polarizer has at least one opening, the at least one opening is configured with another absorptive polarizer, and a transmission axis of the another absorptive polarizer is parallel to the transmission axis of the absorptive polarizer and the transmission axis of the reflective polarizer.

* * * * *